US012069166B2

(12) United States Patent
Stayskal et al.

(10) Patent No.: US 12,069,166 B2
(45) Date of Patent: Aug. 20, 2024

(54) QUORUM-BASED AUTHORIZATION

(71) Applicant: Oracle International Corporation, Redwood Shores, CA (US)

(72) Inventors: Danne Lauren Stayskal, Eastsound, WA (US); Daniel M. Vogel, Seattle, WA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 163 days.

(21) Appl. No.: 17/571,346

(22) Filed: Jan. 7, 2022

(65) Prior Publication Data
US 2023/0224146 A1 Jul. 13, 2023

(51) Int. Cl.
H04L 9/32 (2006.01)
H04L 9/08 (2006.01)
H04L 9/30 (2006.01)

(52) U.S. Cl.
CPC ............ *H04L 9/085* (2013.01); *H04L 9/3066* (2013.01); *H04L 9/3255* (2013.01)

(58) Field of Classification Search
CPC ... H04L 9/0852; H04L 9/0858; H04L 9/0855; H04L 63/061; H04L 9/083; H04L 9/0822; H04L 9/3226; H04L 9/0891; H04L 9/14; H04L 9/0827; H04L 2209/24; H04L 9/08; H04L 9/0819; H04L 9/088; H04L 9/0844; H04L 9/0618; H04L 9/085; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86

USPC .......... 380/28, 255, 264, 276; 726/2, 21, 36; 713/150, 163, 181
See application file for complete search history.

(56) References Cited

U.S. PATENT DOCUMENTS

| | | | | |
|---|---|---|---|---|
| 5,764,765 | A * | 6/1998 | Phoenix | H04L 9/0858 380/256 |
| 6,748,083 | B2 * | 6/2004 | Hughes | H04L 9/0858 380/278 |
| 7,437,081 | B2 * | 10/2008 | Mitchell | H04B 10/70 398/154 |
| 8,761,401 | B2 * | 6/2014 | Sprunk | H04L 9/0844 380/278 |
| 8,782,774 | B1 * | 7/2014 | Pahl | H04L 63/0869 726/4 |
| 8,855,316 | B2 * | 10/2014 | Wiseman | H04L 9/0855 380/278 |
| 9,413,756 | B1 * | 8/2016 | Wang | G06F 21/31 |

(Continued)

OTHER PUBLICATIONS

International Application No. PCT/US2022/079655, International Search Report and the Written Opinion mailed on Mar. 1, 2023, 10 pages.

(Continued)

*Primary Examiner* — Sharif E Ullah
(74) *Attorney, Agent, or Firm* — Kilpatrick Townsend & Stockton LLP

(57) ABSTRACT

A framework for managing authorization for performance of actions with a computing system. For example, techniques for performing authorization of users and/or clients for access to an infrastructure service provided by a cloud servicer provider (CSP) and/or for performance of actions with the infrastructure service.

20 Claims, 13 Drawing Sheets

(56) References Cited

U.S. PATENT DOCUMENTS

| | | | |
|---|---|---|---|
| 9,628,268 B2* | 4/2017 | Kiang | G06F 21/6218 |
| 9,960,465 B2* | 5/2018 | Dudley | H01M 50/204 |
| 10,057,058 B2* | 8/2018 | Murakami | H04L 9/0858 |
| 10,666,657 B1* | 5/2020 | Threlkeld | H04L 9/0643 |
| 10,884,732 B1* | 1/2021 | Zolotow | G06F 8/76 |
| 10,951,618 B2* | 3/2021 | Baer | H04L 63/104 |
| 2005/0138352 A1* | 6/2005 | Gauvreau | H04L 9/3247 |
| | | | 713/153 |
| 2007/0065154 A1* | 3/2007 | Luo | H04J 14/0282 |
| | | | 398/141 |
| 2007/0076884 A1* | 4/2007 | Wellbrock | H04L 9/0855 |
| | | | 380/263 |
| 2007/0195774 A1* | 8/2007 | Sherman | H04L 69/16 |
| | | | 370/392 |
| 2007/0245414 A1* | 10/2007 | Chan | H04L 9/3234 |
| | | | 726/12 |
| 2011/0206204 A1* | 8/2011 | Sychev | H04J 14/0273 |
| | | | 380/256 |
| 2011/0213979 A1* | 9/2011 | Wiseman | H04L 9/0844 |
| | | | 713/171 |
| 2011/0265166 A1* | 10/2011 | Franco | H04W 12/062 |
| | | | 726/7 |
| 2014/0010234 A1* | 1/2014 | Patel | H04L 45/74 |
| | | | 370/392 |
| 2014/0068765 A1* | 3/2014 | Choi | H04L 63/1416 |
| | | | 726/23 |
| 2014/0133652 A1* | 5/2014 | Oshida | H04L 9/0897 |
| | | | 380/255 |
| 2014/0282972 A1* | 9/2014 | Fan | H04L 63/0815 |
| | | | 726/7 |
| 2015/0012990 A1* | 1/2015 | Copsey | H04L 47/803 |
| | | | 726/7 |
| 2016/0142409 A1* | 5/2016 | Frei | G06F 21/33 |
| | | | 713/176 |
| 2016/0182487 A1* | 6/2016 | Zhu | H04L 63/083 |
| | | | 726/9 |
| 2016/0241396 A1* | 8/2016 | Fu | H04L 9/0836 |
| 2016/0359626 A1* | 12/2016 | Fu | H04L 9/0858 |
| 2016/0366094 A1* | 12/2016 | Mason | H04L 61/5038 |
| 2017/0214525 A1* | 7/2017 | Zhao | H04W 12/0431 |
| 2017/0230173 A1* | 8/2017 | Choi | H04L 9/0861 |
| 2018/0176091 A1* | 6/2018 | Yoon | H04L 43/0888 |
| 2019/0034936 A1* | 1/2019 | Nolan | G06Q 20/42 |
| 2019/0036821 A1* | 1/2019 | Levy | G06F 12/0868 |
| 2019/0349392 A1* | 11/2019 | Wetterwald | H04L 43/0852 |
| 2020/0084222 A1* | 3/2020 | William | H04L 63/12 |
| 2020/0280855 A1* | 9/2020 | Avetisov | H04L 63/0884 |
| 2021/0258169 A1* | 8/2021 | Basu | H04L 9/0637 |

OTHER PUBLICATIONS

International Application No. PCT/US2022/079919, International Search Report and Written Opinion mailed on Mar. 3, 2023, 13 pages.

U.S. Appl. No. 17/571,338, Non-Final Office Action mailed on Sep. 8, 2023, 26 pages.

* cited by examiner

QUORUM-BASED AUTHORIZATION

BACKGROUND

A cloud service provider (CSP) provides a variety of services to users or clients on demand using different systems and infrastructure services. The CSP provides infrastructure services that can be used by clients to build their own networks and deploy customer resources. To ensure security and continued availability of the infrastructure services of the CSP, authorization for the users and/or clients to use and perform actions with the infrastructure services may be sought to prevent bad actors from accessing unauthorized data and/or attacking portions of the infrastructure services.

Legacy approaches for seeking authorization for users and/or clients to use and perform actions with the infrastructure services of the CSP would often times result in the sharing of sensitive information with the users and/or clients that may be utilized for unauthorized access of the system by third parties and/or performance of unauthorized actions. The legacy approaches also required pre-approved authorization for performing actions, where the users and/or clients required authorization for performance of an action prior to requesting performance of the action in order to be allowed performance of the action.

SUMMARY

The present disclosure relates generally to a framework for managing authorization for performance of actions with a computing system, such as a cloud infrastructure service. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure is directed to one or more non-transitory, computer-readable media having instructions stored thereon, wherein the instructions, when executed by a computing system, may cause the computing system to receive a request for an action to be performed by the computing system, the request received from a client device. The instructions, when executed by the computing system, may further cause the computing system to identify one or more authorizers from which authorization of the action is to be received, the authorization corresponding to performance of the action for the client device. The instructions, when executed by the computing system, may further cause the computing system to further serialize one or more operations corresponding to the action and sign the serialized one or more operations via an elliptic curve digital signature algorithm. Further, the instructions, when executed by the computing system, may cause the computing system to initiate an inquiry procedure for the authorization of the action from each of the one or more authorizers to determine whether the one or more operations are authorized to be performed.

An aspect of the present disclosure is directed to a method of determining authorization of an action for a cloud infrastructure service, comprising receiving, by a security element, a request for an action to be performed by the cloud infrastructure service, and identifying, by the security element, one or more authorizers from which authorization of the action is to be received, the authorization corresponding to performance of the action The method may further include determining, by the security element, one or more operations to be performed by the cloud infrastructure service to complete the action, signing, by the security element, the one or more operations via an elliptic curve digital signature algorithm, and storing, by the security element, the signed one or more operations. The method may further include initiating, by the security element, an inquiry procedure for the authorization of the action based at least in part on responses received from the one or more authorizers.

An aspect of the present disclosure is directed to a computing system, comprising memory to store operations for performance by the computing system, and one or more processors coupled to the memory, the one or more processors to identify a request for an action to be performed by the computing system, the request received from a client device and identify one or more authorizers from which authorization of the action is to be received, the authorization corresponding to performance of the action for the client device. The one or more processors may further determine one or more operations to be performed by the computing system to complete the action, serialize the one or more operations, and sign the serialized one or more operations via an elliptic curve digital signature algorithm. Further, the one or more processors may store the signed, serialized one or more operations in the memory, and initiate an inquiry procedure for authorization of the action from the one or more authorizers.

The foregoing, together with other features and embodiments will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Figure 9:
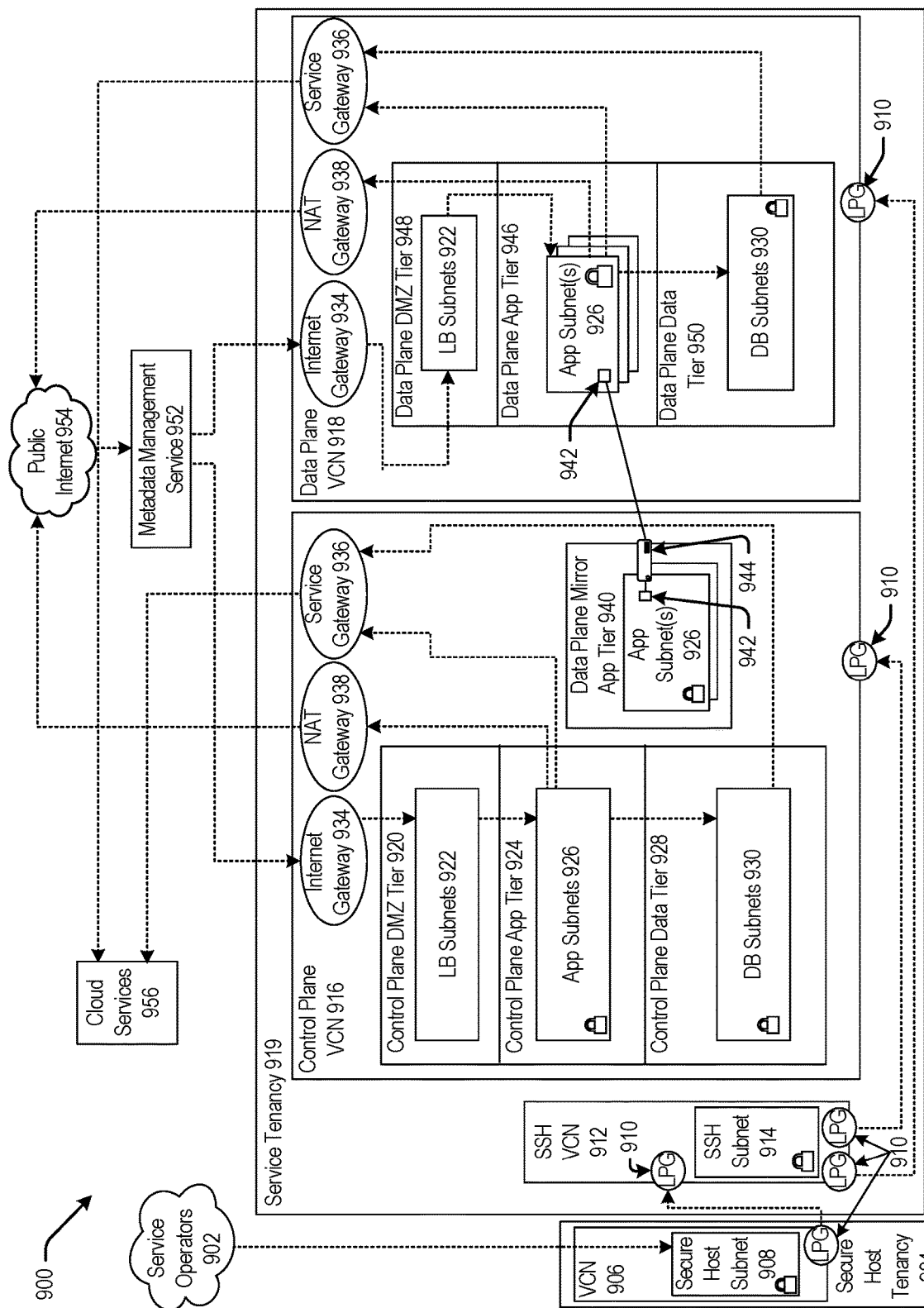
FIG. 9 is a block diagram illustrating one pattern for implementing a cloud infrastructure as a service system, according to at least one embodiment.
Figure 10:
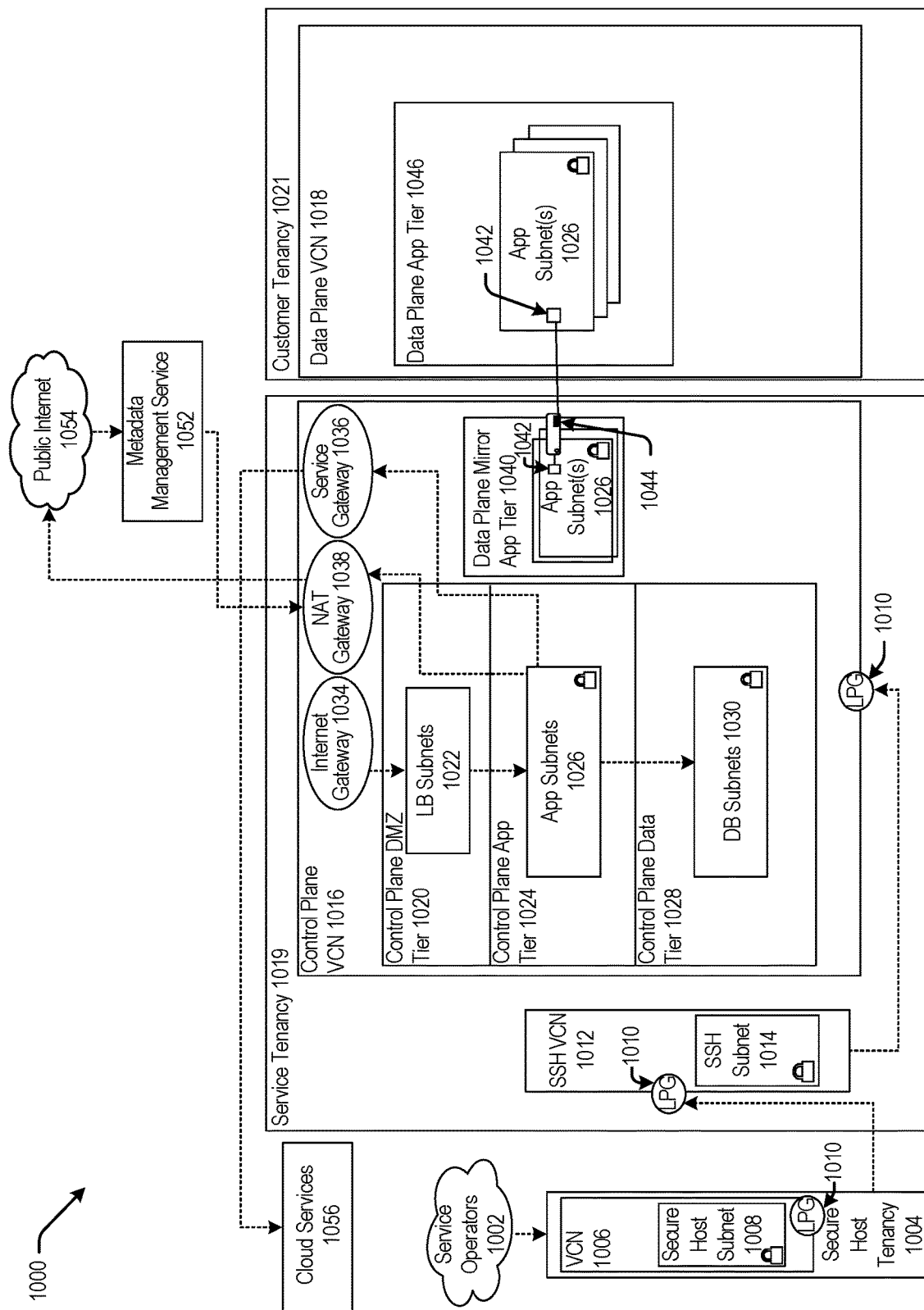
FIG. 10 is a block diagram illustrating another pattern for implementing a cloud infrastructure as a service system, according to at least one embodiment.
Figure 11:
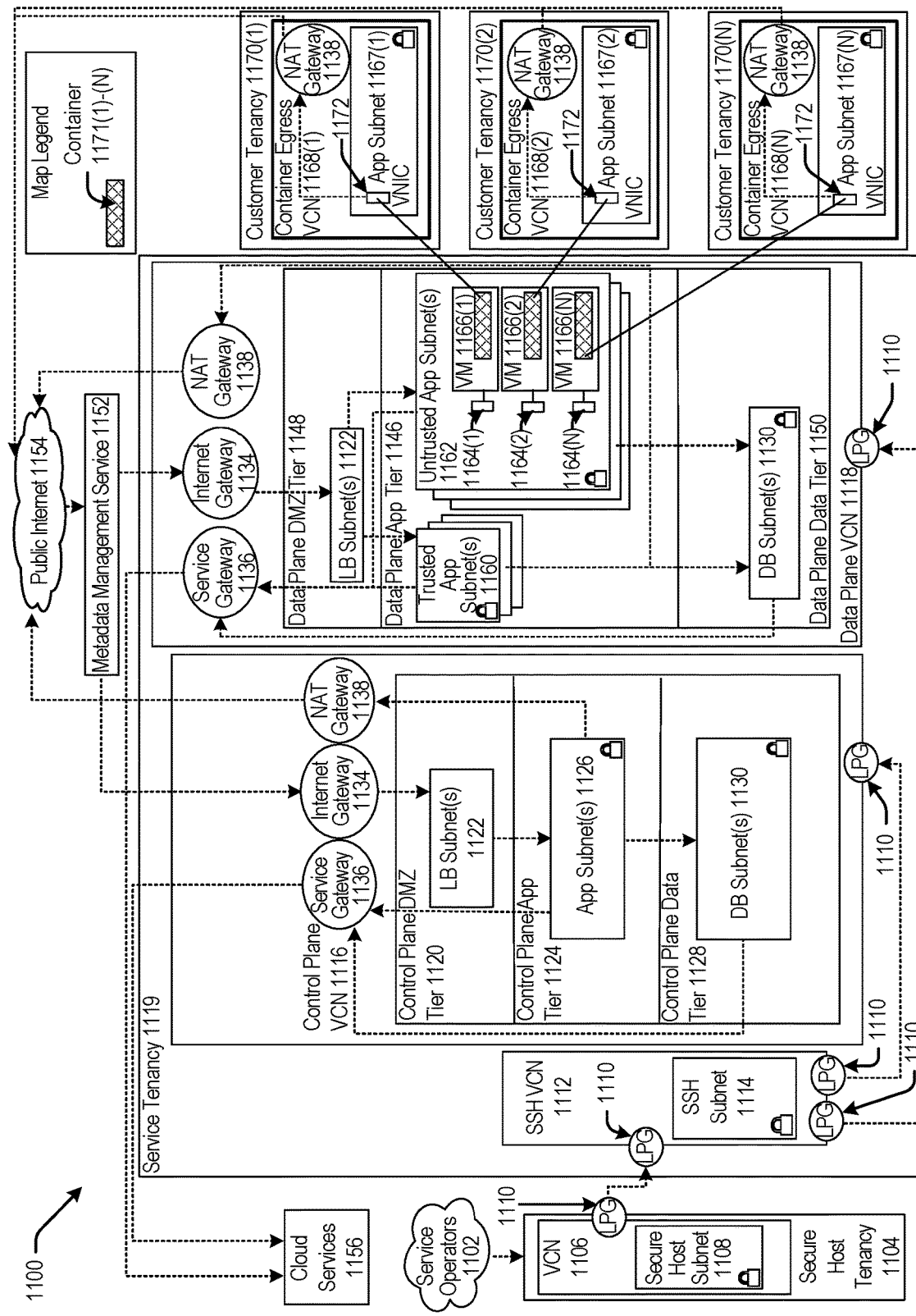
FIG. 11 is a block diagram illustrating another pattern for implementing a cloud infrastructure as a service system, according to at least one embodiment.
Figure 12:
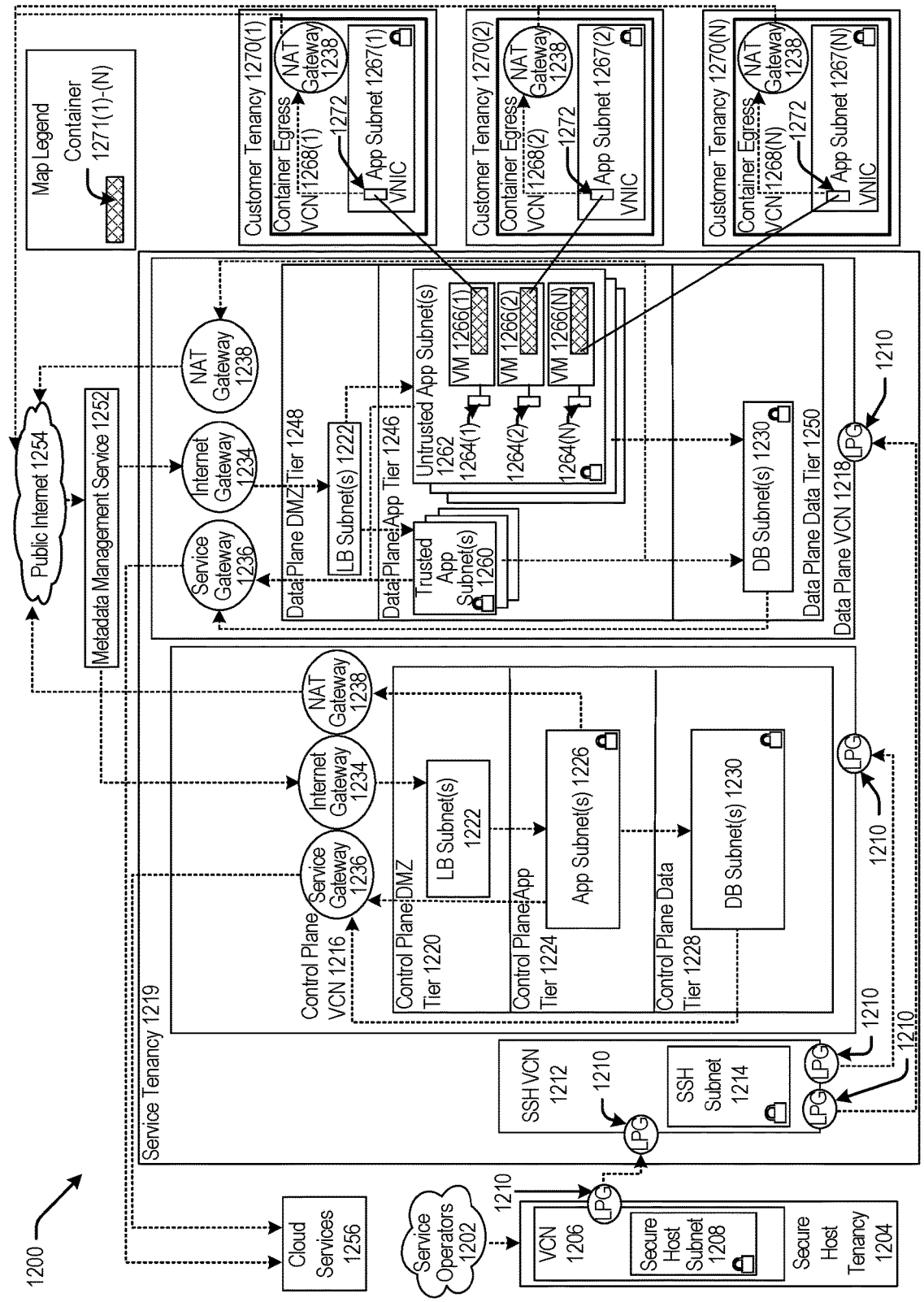
FIG. 12 is a block diagram illustrating another pattern for implementing a cloud infrastructure as a service system, according to at least one embodiment.

The present disclosure describes techniques for performing authorization of users and/or clients (which is collectively referred to as "clients" throughout this disclosure) for access to an infrastructure service (such as a cloud infrastructure service, e.g., the cloud infrastructure of FIG. 9, the cloud infrastructure of FIG. 10, the cloud infrastructure of FIG. 11, and/or the cloud infrastructure of FIG. 12) provided by a cloud servicer provider (CSP) and/or for performance of actions with the infrastructure service. More particularly, real-time authorization may be provided where the infrastructure service may seek authorization for a client in response to receiving a request for performance of an action from the client rather than having authorization being required prior to the request for authorization. The infrastructure service may serialize one or more operations for performance of the action and may sign the serialized operations via an elliptic curve digital signature algorithm (ECDSA). The infrastructure service may store the serialized operations and may thaw and perform the operations once authorization has been received for the action being performed by the client.

A CSP may provide a variety of services to clients on demand using different systems and infrastructure services (referred to herein as cloud infrastructure service). In certain embodiments, a CSP may provide services under an Infrastructure-as-a-Service (IaaS) model, wherein the CSP provides infrastructure services that can be used by client to build their own networks and deploy customer resources. The CSP-provided infrastructure may include interconnected high-performance computer resources including various host machines (also referred to as hosts), memory resources, and network resources that form a physical network, which is referred to as a substrate network or an underlay network. The CSP-provided infrastructure may be spread across one or more data centers that may be geographically spread across one or more regions.

The physical network of the CSP, which may include the various host machines, memory resources, and/or network resources, may provide the underlying basis for creating one or more virtual or overlay networks on top of the physical network. These virtual or overlay networks (also referred to as software-based or software-defined networks) may be implemented using software virtualization technologies to create layers of network abstraction that can be run on top of the physical network. Overlay networks can take on many forms. Overlay networks may use Layer-3 IP addressing with endpoints designated by their virtual IP addresses. This method of overlay networking is often referred to as virtual Layer 3 networking.

When a client subscribes to or registers for an IaaS service provided by a CSP, a tenancy may be created for that client, where the tenancy is a secure and isolated partition within the CSP's infrastructure service where the client can create, organize, and administer their cloud resources. For example, a client can use resources provided by the CSP to build one or multiple customizable and private virtual network(s) referred to as virtual cloud networks (VCNs) within the client's tenancy. One or more client resources, such as compute instances (e.g., virtual machines, bare metal instances, etc.) can be deployed on these client VCNs.

When a client attempts to access the infrastructure service to establish a tenancy or perform another action, the client may transmit a request to the infrastructure service requesting to establish the tenancy or perform the other action. The infrastructure service may receive the request and determine that the client is requesting the infrastructure service to perform an action. Based on the action and/or the client, the infrastructure service may determine that authorization is required from one or more authorizers to authorize the action to be performed for the client. The infrastructure service may identify the one or more authorizers for providing the authorization based on the client and/or action, where the authorizers may be predefined. The infrastructure service may provide one or more requests for authorization of performance of the action for the client to each of the determined authorizers. The infrastructure service may monitor from response from the authorizers and determine based on the responses from the authorizers whether the client is authorized for performance of the action.

Based on the action requested by the client, the infrastructure service may determine one or more operations to be performed by the infrastructure service to complete the action. In some embodiments, the client may be stateful, whereas the infrastructure service may be stateless. To facilitate this interfacing between the stateful client and the stateless infrastructure service, the states associated with the action may be serialized and stored in a manner that can be thawed and validated once an authorization determination has been made by the infrastructure service. For example, the infrastructure service may serialize the operations associated with the action. The infrastructure service may sign the serialized operations and store the signed, serialized operations via a elliptic curve digital signature algorithm (ECDSA). Using the ECDSA for the signature may use less clock cycles for cryptographic protection data as compared to legacy approaches for cryptographic protection of the same data to the same level. Further, using the ECDSA may provide for the encrypted data to be post-quantum secure.

If the infrastructure service determines that the action is authorized to be performed for the client, the infrastructure service may retrieve the signed, serialized operations. The infrastructure service may verify that the serialized operations have not been tampered with based on signature produced by signing the serialized operations. For example, the infrastructure service may verify that a signature corresponding to the signed, serialized operations retrieved from storage matches the signature produced at the time that serialized operations were signed. If the infrastructure service verifies the serialized operation have not been tampered with, the infrastructure service may perform the serialized operations. For example, the infrastructure service may perform the operations in accordance states defined by the states defined by the stateful client.

Figure 1:
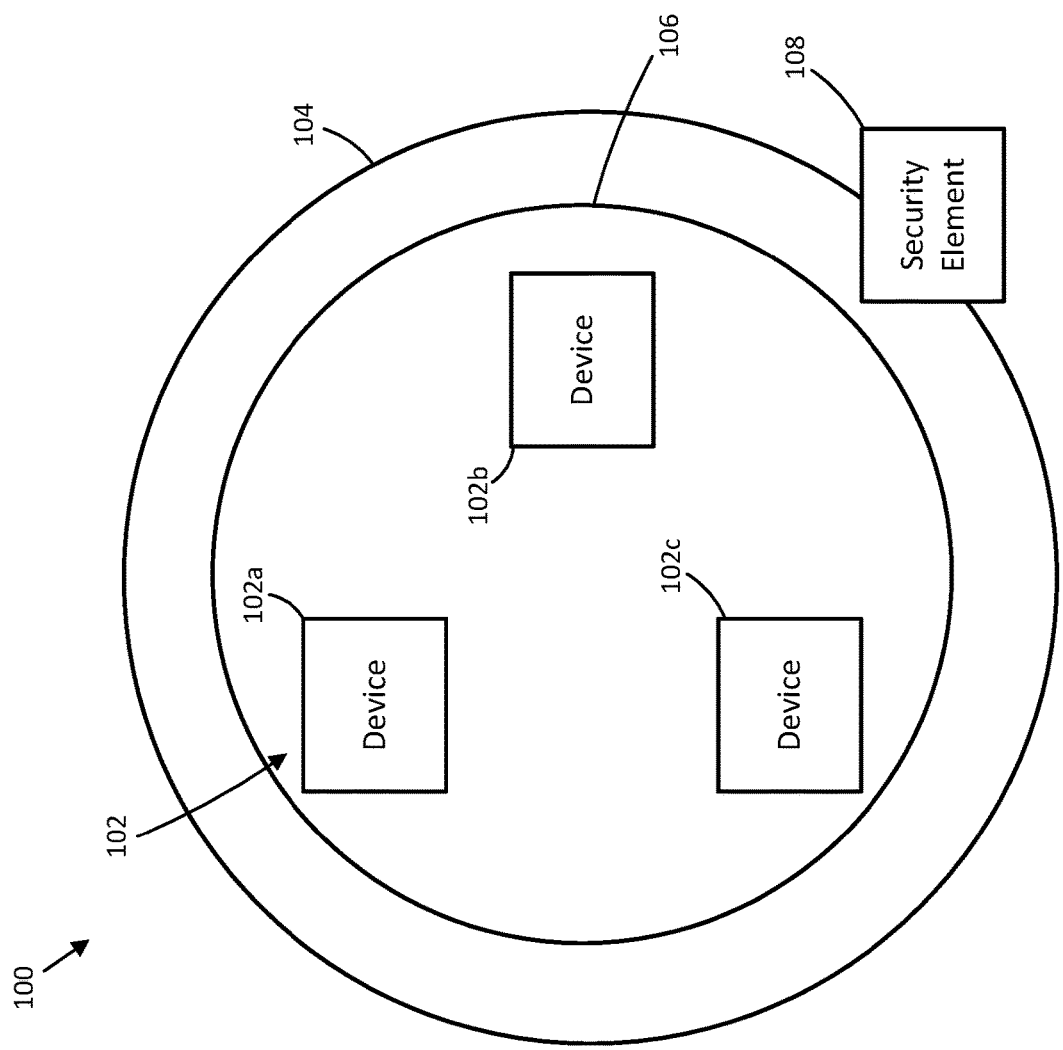
FIG. 1 illustrates an example infrastructure service arrangement in accordance with some embodiments.

FIG. 1 illustrates an example infrastructure service arrangement 100 in accordance with some embodiments. In particular, the infrastructure service arrangement 100 illustrates a portion of an infrastructure service that may implement one or more of the approaches for determining authorization described throughout the disclosure. In some embodiments, the infrastructure service may include one or more of the features of the cloud infrastructure of FIG. 9, the cloud infrastructure of FIG. 10, the cloud infrastructure of FIG. 11, and/or the cloud infrastructure of FIG. 12. The infrastructure service may comprise a computing system. In some embodiments, the infrastructure service may comprise a cloud computing system. The infrastructure service may include hardware and/or software of the infrastructure that can provide services for a client.

The infrastructure service may include one or more devices 102 that are communicatively coupled to provide a portion of the infrastructure service. For example, the infrastructure service arrangement 100 includes a first device 102a, a second device 102b, and a third device 102c in the illustrated embodiment. The devices 102 may comprise computing devices, such as computer terminals, servers, other computer devices, or some combination thereof. The devices 102 may communicate with each other to form a portion of the infrastructure service, where the infrastructure service may provide infrastructure services such as cloud infrastructure services.

The devices 102 may be grouped into different enclaves. For example, the first device 102a, the second device 102b, and the third device 102c may form part of an enclave 104 of the infrastructure service. The enclave 104 may perform particular operations. For example, the enclave 104 may comprise a management enclave that provides management operations, a service enclave that provides service operations, or a customer enclave that provide customer operations to the client. The enclave 104 may implement a software-defined perimeter (SDP) security model to create a protected IaaS instance. The enclave 104 may have a unique communication profile, which may be different from other communication profiles of different enclaves in the infrastructure service. Access into and out of the enclave 104 may be controlled, monitored, and/or policy driven. For example, access to the enclave 104 may be based on authorization, where access to the enclave 104 may be limited to authorized clients. The enclave 104 may require a client to receive authorization from one or more authorizers to provide access to the enclave 104. The enclave 104 may have a SDP defined that includes one or more devices (such as the first device 102a, the second device 102b, and the third device 102c) and/or certain software, where an edge of the enclave 104 is defined by the separation of the devices and/or software from elements outside of the enclave 104.

The enclave 104 may have a firewall 106 that protects against malicious network traffic. For example, the enclave 104 may have a software-based firewall 106 that monitors network traffic with the enclave 104 and protects against malicious network traffic. The firewall 106 may be located within the edge of the enclave 104 and may protect at least a portion of the devices and/or software of the enclave 104.

The infrastructure service may include one or more security elements, such as the security element 108. The security element 108 may comprise a device, software, or some combination thereof. The security element 108 may be located at the edge of the enclave 104. Further, the security element 108 may be located outside of the firewall 106 of the enclave 104. For example, security element 108 may be located at the edge of the enclave 104 and/or outside of the firewall 106 to allow communication with the security element 108 without accessing secure portions of the enclave 104.

The security element 108 may determine whether a client attempting to access the enclave 104 and/or the infrastructure service is authorized to access the enclave 104 and/or infrastructure service. For example, a client may transmit a request for the enclave 104 and/or the infrastructure service to perform one or more actions. The security element 108 may receive the request and determine whether the client has already received authorization for performance of the one or more actions. If the security element 108 determines that the client already has authorization for accessing the enclave 104 and/or the infrastructure service, the security element 108 may cause the enclave 104 and/or the infrastructure service to perform the one or more actions requested by the client.

If the security element 108 determines that the client had not previously been provided for authorization for performance of the one or more actions, the security element 108 may initiate a procedure for determining whether the client is to be granted authorization for performance of the one or more actions. For example, the security element 108 may identify one or more authorizers that can provide the client with authorization to perform the one or more actions. The authorizers may include one or more individuals and/or devices that have the ability to grant authorization to the client for the one or more actions. The authorizers may be able to grant the client authorization to the infrastructure service and/or the enclave 104, performance of the one or more actions, or some combination thereof. The authorizers may be predefined or may be defined at the time of the request.

Based on the security element 108 determining that the client had not previously been provided for authorization for performance of the one or more actions, the security element 108 may not initially perform the one or more actions. In particular, the security element 108 may store the one or more actions until authorization is received from the authorizers, an amount of time for receiving authorization from the authorizers has expired, or the authorizers indicate that the client is unauthorized for performance of the one or more actions. The security element 108 may convert the one or more actions into one or more operations for storage, where the one or more operations are to be performed to complete the one or more actions. The operations may be in a format that can be performed by the infrastructure service, whereas the actions may be in a different format.

The client may be stateful while the infrastructure service may be stateless. To perform the operations properly, the infrastructure service may take the state for the operations into account when performing the operations. To ensure that the state is taken into account when the operations are performed, the operations may be stored in a certain format to maintain the states for operation by the infrastructure service. For example, the security element 108 may serialize operations for storage. For example, the security element 108 may translate the operations into a format that can be stored and can be reconstructed at a later time. The serialization of the operations may allow the infrastructure service to maintain the states of the operations while being performed by the stateless infrastructure service.

The security element 108 may further sign the operations. For example, the security element 108 may sign the serialized operations. The security element 108 may sign the operations via an elliptic curve digital signature algorithm (ECDSA). For example, the security element 108 may utilize ECDSA with a key to produce a signature for signing the operations. The security element 108 may produce a signature based on the key, the signature being associated with the signed operations. The security element 108 may maintain the key within the enclave 104, while the security element 108 may share the signature with the client requesting the actions. The security element 108 may then store the signed, serialized operations, such as in a memory of the infrastructure service. Using the ECDSA for signature of the operations may provide post quantum security. For example, the cost of resources that it would take for a quantum computer to crack the ECDSA would be more expensive than the data that the ECDSA is protecting for the post quantum security. Further, using the ECDSA may be faster than legacy approaches, such as the ECDSA using less clock cycles to protect to the data to the same level as compared to legacy approaches.

The security element 108 may initiate an inquiry procedure for authorization of the action from each of the one or more authorizers to determine whether the one or more operations are authorized to be performed. For example, the security element 108 may transmit one or more authorization requests to each of the authorizers, where the authorization requests may request a response from each of the authorizers as to whether the client is authorized for the one or more actions requested by the client. The security element 108 may transmit the authorization requests as text messages, electronic mail, push messages, and/or other messages that provide for response by the authorizers. The authorization requests may allow each of the authorizers to respond to indicate that the client is authorized or unauthorized for performance of the actions. The security element 108 may monitor for responses from each of the one or more authorizers to the authorization requests The security element 108 may determine whether the client has authorization for performance of the one or more actions based on responses, or lack thereof, received from the authorizers. For example, the security element 108 may receive responses from the authorizers in response to the authorization requests previously provided by the security element 108. In some embodiments, the security element 108 may wait until responses are received from all the authorizers prior to performing the determination of whether the client has authorization for performance of the one or more actions. The security element 108 may determine whether each of the responses from the authorizers indicated that the client is authorized for performance of the one or more actions or unauthorized for performance of the one or more actions. The security element 108 may determine that the client has authorization for performance of the one or more actions based on each of the responses indicating that the client has authorization for performance of the one or more actions. In contrast, the security element 108 may determine that the client does not have authorization for performance based on any of the responses indicating that the client is unauthorized to perform the one or more actions.

In other instances, the security element 108 may determine that the client has authorization based on a certain percentage of the responses indicating that the client has authorization for performance of the one or more actions, or responses corresponding to certain authorizers indicate that the client has authorization for performance of the one or more actions. For example, the security element 108 may determine that the client has authorization based on a greater number of the responses indicating that the client has authorization for performance of the one or more actions than the number of responses indicating that the client is unauthorized for performance of the one or more actions in some instances. In some instances, there may be certain authorizers and/or a certain group of authorizers that can provide authorization for performance of the one or more actions for the client regardless of the responses of the other authorizers. For example, out of the authorizers to which authorization requests, the security element 108 may determine that a predefined authorizer or a predefined group of authorizers indicated that the client has authorization for performance of the one or more actions and may determine that the client has authorization for the one or more actions based on the indications of the predefined authorizer or predefined group of authorizers indicating that the client is authorized for performance of the one or more actions. In some instances, one or more of the authorizers may grant authorization in the alternative, such that if any one of a group of authorizers indicates that the client has authorization for performance of the one or more actions the security element 108 may determine that the client has authorization for performance of the one or more actions.

In some instances, the security element 108 may implement a timer for responses from the authorizers for determination of whether the client has authorization for performance of the one or more actions. For example, if the security element 108 determines that adequate responses from the authorizers for providing the authorization to the client for the one or more actions have not been received within a time period defined by the timer, the security element 108 may determine that the client does not have authorization for performance of the one or more actions.

If the security element 108 determines that the client does not have authorization for performance of the one or more actions based on the responses from the authorizers, the security element 108 may not perform the operations associated with the one or more actions. The security element 108 may further remove the stored operations from memory based on the determination that the client does not have authorization for performance of the one or more actions.

If the security element 108 determines that the client has authorization for performance of the one or more actions based on the responses from the authorizers, the security element 108 may perform the operations. For example, the security element 108 may retrieve the signed, serialized operations from memory. The security element 108 may check the signature of the signed, serialized operations to determine whether the operations have been tampered with. For example, the security element 108 may compare a signature of the signed, serialized operations at the time of retrieval with a signature produced when the serialized operations were signed. If the signatures match, the security element 108 may determine that the operations have not been tampered with. If the signatures do not match, the security element 108 may determine that the operations have been tampered with.

If the security element 108 determines that the operations have been tampered with, the security element 108 may prevent the operations from being performed even if the security element 108 determines that the client has authorization for performance of the one or more actions. If the security element 108 determines that the operations have not been tampered with, the security element 108 may proceed with causing the serialized operations to be performed. For example, the security element 108 may cause the serialized operations to be performed by the infrastructure service, where the serialization of the operations causes state to be taken into account when performing the operations.

While the infrastructure service arrangement 100 illustrates an embodiment of a portion of infrastructure service, it should be understood that other embodiments of infrastructure services having the features of the infrastructure service arrangement 100 are to be covered by the disclosure. For example, enclaves (such as the enclave 104) may be formed by one or more devices and/or one or more devices may be included in multiple enclaves. Further, the infrastructure service may include multiple enclaves rather than the single enclave illustrated. Each enclave may further include multiple security elements where each of the security elements may be accessed by any of the clients, each of the security elements may be dedicated to a corresponding client such that the corresponding client may access the corresponding security element, or some combination thereof.

Figure 2:
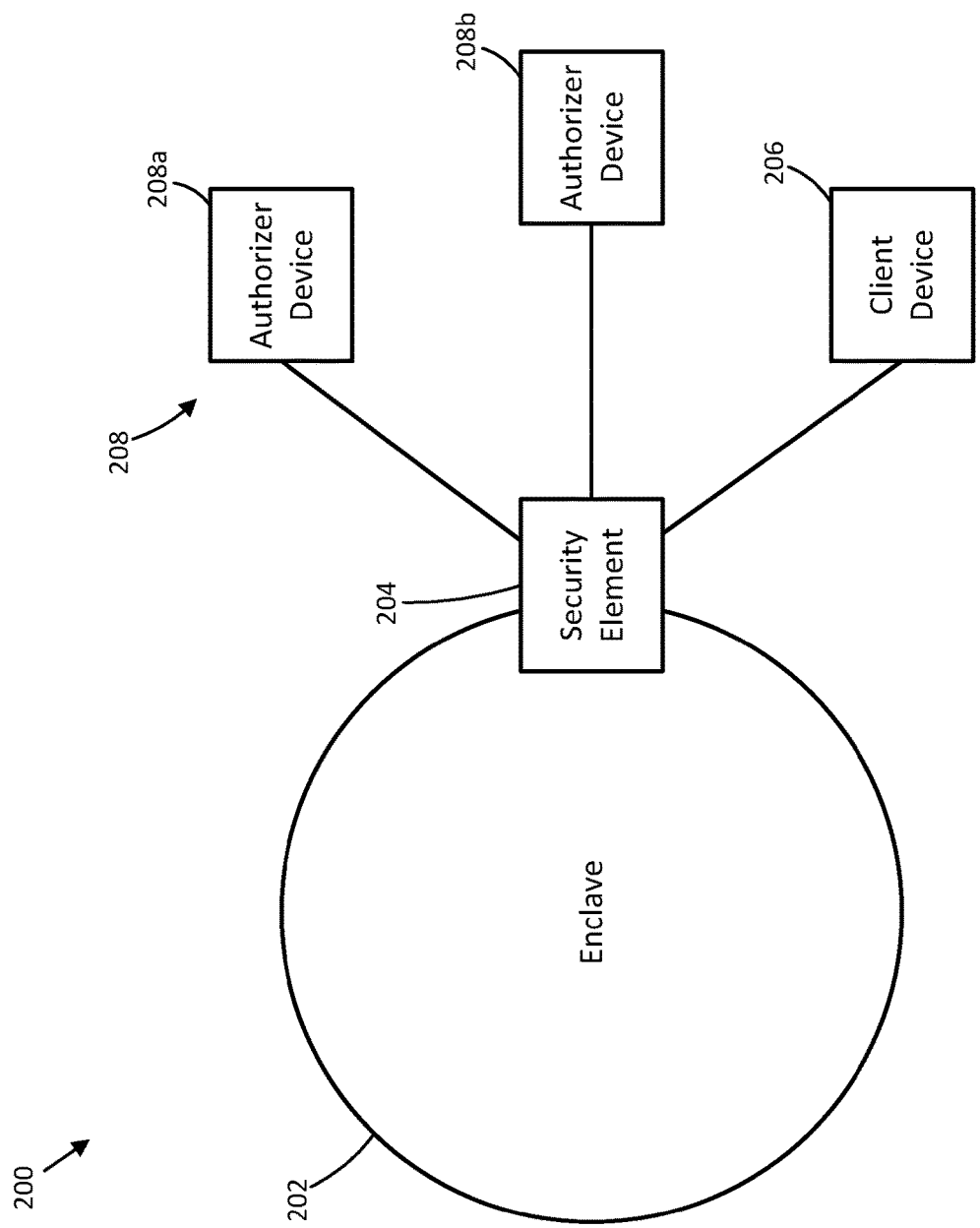
FIG. 2 illustrates an example authorization arrangement in accordance with some embodiments.

FIG. 2 illustrates an example authorization arrangement 200 in accordance with some embodiments. For example, the authorization arrangement 200 illustrates an example layout of devices for illustrating the approach of quorum-based authorization in accordance with some embodiments. It should be understood that the authorization arrangement 200 is a single embodiment used to illustrate the approach and implementation of the approach is not limited to the example layout illustrated.

The authorization arrangement 200 may include an enclave 202. The enclave 202 may include one or more of the features of the enclave 104 (FIG. 1). The enclave 202 may comprise an infrastructure service, or a portion thereof, such as the infrastructure service described in relation to FIG. 1. The infrastructure service may comprise a computing system, such as a cloud computing system, in some embodiments. The enclave 202 may include one or more security elements, such as the security element 204 illustrated. The security element 204 may include one or more of the features of the security element 108 (FIG. 1).

The authorization arrangement 200 may include a client device 206. The client device 206 may comprise a single device, another infrastructure service, or a cloud computing system. In some embodiments, the client device 206 may be maintained by a separate operator from the enclave 202. The client device 206 may communicate with the enclave 202 via a network, such as via the interne. In some embodiments, the client device 206, or a user utilizing the client device 206 (where the client device 206 and the user may be referred to as a client), may be associated with a subscriber to an interface service provided by the enclave 202 (or an infrastructure service that includes the enclave 202), where the enclave 202 may provide services to the client device 206. In some embodiments, the subscriber may comprise an organization that can include multiple users and/or client devices. The interface service may comprise a cloud computing service in some embodiments. The client device 206 may be able to request services to be provided by the enclave 202. A user may access the client device 206 and utilize the client device 206 to request services from the enclave 202. For example, the user may be an individual that can sign into the client device 206, where the user signing into the client device 206 may verify an identity of the user.

When the client device 206 requests an action and/or service from the enclave 202, the enclave 202 may perform an authorization procedure for determining whether the client device 206 and/or the user utilizing the client device 206 is authorized for performance of the action and/or the service. For example, the client device 206 may transmit a request to the enclave 202 for performance of one or more actions by the enclave 202, or the infrastructure service that includes the enclave 202. The security element 204 may receive the request from the client device 206 and may determine that the client device 206 is requesting one or more actions to be performed by the enclave 202, or the infrastructure service that includes the enclave 202.

Based on the request received from the client device 206, the security element 204 may determine an identity of the client device 206 and/or the user utilizing the client device 206 to transmit the request. For example, the request received from the client device 206 may include an identifier corresponding to the client device 206, an identifier corresponding to the user utilizing the client device 206, or both. The security element 204 may determine whether the client device 206 and/or the user utilizing the client device 206 have previously been granted authorization for performance of the actions being requested. For example, the client device 206 may have previously provided with authorization for future performances of types of actions. The security element 204 may determine whether the actions being requested in the request fall within any of the types of actions for which the client device 206 and/or the user utilizing the client device 206 has previously received authorization for performance. If the security element 204 determines that authorization for the actions had been previously presented to the client device 206 and/or the user utilizing the client device 206, the security element 204 may cause enclave 202 and/or the infrastructure service to perform the actions.

If the security element 204 determines that the authorization for the actions had not been previously presented to the client device 206 and/or the user utilizing the client device 206, the security element 204 may perform a procedure to determine whether the client device 206 and/or the user utilizing the client device 206 is to receive authorization for the actions based on the request. For example, the security element 204 may identify one or more authorizers that can provide authorization for the client device 206 and/or the user utilizing the client device 206 to have the actions performed. The authorizers may be individuals, devices, or some combination thereof, that have the ability to grant authorization to the client device 206 and/or the user utilizing the client device 206 for performance of the actions. The authorizers may be predefined or defined at the time of the request. The authorizers may be associated with a same subscriber as the client device 206 and/or the user utilizing the client device 206, or may be assigned by the subscriber. If the security element 204 determines that authorizers have not been assigned for the client device 206 and/or the user utilizing the client device 206 for performance of the actions, the security element 204 may determine that the enclave 202 and/or the infrastructure service are not to perform the actions. If the security element 204 identifies one or more authorizers assigned for the client device 206 and/or the user utilizing the client device 206 for performance of the actions, the security element 204 may proceed with the determination of whether the client device 206 and/or the user utilizing the client device 206 is to receive authorization for the actions.

As there may be delay between the time that the request is received and authorization is received from the authorizers, the security element 204 may store the actions for future performance. The client device 206 may be stateful, whereas the enclave 202 and/or the infrastructure service may be stateless. To properly perform the actions, the state for the actions may need to be taken into account. Accordingly, the security element 204 may store the actions in a way to maintain the state corresponding to the actions. For example, the security element 204 may determine one or more operations that are to be performed by the enclave 202 and/or the infrastructure service to complete the actions being requested. The security element 204 may store the operations in a certain format to maintain states corresponding to the operations. For example, the security element 204 may serialize the operations for storage. The security element 204 may translate the operations into a format that can be stored and can be reconstructed at a later time. The serialization of the operations may allow the enclave 202 and/or the infrastructure service to maintain the states of the operations when being performed by the stateless enclave 202 and/or the infrastructure service.

The security element 204 may further sign the operations for storage. The signing of the operations may be utilized for verifying that the operations have not been tampered with prior to performance by the enclave 202 and/or the infrastructure service. The security element 204 may sign the operations via an ECDSA. For example, the security element 204 may utilize ECDSA with a key for signing the operations. A signature produced by the ECDSA and the key may be associated with the operations. The security element 204 may maintain the key within the enclave 202, while the security element 204 may share the signature with the client device 206 that transmitted the request. The security element 204 may then store the signed, serialized operations, such as in a memory of the security element 204, the enclave 202, and/or the infrastructure service. Using the ECDSA for the signature may provide post quantum security and may utilize less clock cycles as compared to legacy approaches.

The security element 204 may initiate an inquiry procedure for determining whether the client device 206 and/or the user utilizing the client device 206 is to receive authorization for performance of the actions. The security element 204 may identify accounts (such as email accounts, messaging accounts, social media accounts, or other accounts at which an authorizer can be provided a message), telephone numbers, devices, or some combination thereof for the authorizers identified for providing authorization for the client device 206 and/or the user utilizing the client device 206. The security element 204 may transmit one or more requests to each of the authorizers requesting responses indicating whether the client device 206 and/or the user utilizing the client device 206 is to be granted authorization for the actions. The requests may include an indication of the client device 206 and/or the user of the client device 206 seeking authorization for the actions. The security element 204 may transmit the requests to one or more of the accounts, telephone numbers, devices, or some combination thereof for each of the authorizers. The requests may request the authorizers to respond with an indication that client device 206 and/or the user utilizing the client device 206 is to be provided with authorization or is not to be provided with authorization for the actions. In some instances, the security element 204 may send one or more follow up requests after an initial request requesting the indication of whether the client device 206 and/or the user of the client device 206 is to be granted authorization for the actions.

The authorization arrangement 200 may include one or more authorizer devices 208, such as the first authorizer device 208a and the second authorizer device 208b. The authorizer devices 208 may correspond to one or more of the authorizers. For example, each of the authorizer devices 208 may comprise a device where one or more of the authorizers may access an account, telephone number, and/or the device to which the request is transmitted to by the security element 204. Based on the identified authorizers, the security element 204 may identify the authorizer devices 208 associated with the identified authorizers and transmit the requests to the authorizer devices 208 in some instances. In some instances, the authorizer devices 208 may include input devices that allow the authorizer to input an indication of whether the client device 206 and/or the user utilizing the client device 206 are to be provided authorization for the actions.

The security element 204 may provide the requests to each of the authorizer devices 208. For example, the security element 204 may transmit the request directly to each of the authorizer devices 208, to accounts that can be accessed via the authorizer devices 208, to telephone numbers associated with the authorizer devices 208, or some combination thereof. In the illustrated embodiment, the security element 204 may transmit one or more requests to the first authorizer device 208a for seeking an indication from a first authorizer and may transmit one or more requests to the second authorizer device 208b for seeking an indication from a second authorizer. In some instances, the first authorizer device 208a and/or the second authorizer device 208b may display a user interface on the device that requests indication of authorization for the client device 206 and/or the user utilizing the client device 206 from the corresponding authorizer. Each of the authorizer devices 208 may detect an indication from the corresponding authorizer of whether the client device 206 and/or the user utilizing the client device 206 are to be provided authorization for the actions. Based on the indications received from the authorizers, the authorizer devices 208 may transmit indications of whether the client device 206 and/or the user of the client device 206 is to be granted authorization for the actions. In some instances, one or more of the authorizer devices 208 may not be provided an indication by the authorizer, in which case the one or more of the authorizer devices not receiving an indication may not provide a response to the security element 204.

The security element 204 may monitor for responses from the authorizer devices 208 and may receive the responses from the authorizer devices 208. For example, the security element 204 may receive a first response from the first authorizer device 208a corresponding to the first authorizer and a second response from the second authorizer device 208b corresponding to the second authorizer in the illustrated embodiment. The security element 204 may determine whether the client device 206 and/or the user of the client device 206 is to be granted authorization for the actions. In some embodiments, the security element 204 may wait until responses are received from all the authorizers to which requests were transmitted prior to determining whether the client device 206 and/or the user of the client device 206 is to be granted authorization for the actions. If the security element 204 determines that all of the authorizers indicated that the client device 206 and/or the user utilizing the client device 206 are to be authorized for performance of the actions, the security element 204 may determine that the client device 206 and/or the user utilizing the client device 206 are to be authorized for the actions. If any of the authorizers indicated that the client device 206 and/or the user utilizing the client device 206 are not to be authorized for performance of the actions, the security element 204 may determine that the client device 206 and/or the user utilizing the client device 206 are not authorized to perform the actions.

In some instances, the security element 204 may not require unanimous indications from the authorizers that the client device 206 and/or the user utilizing the client device 206 is to be granted authorization to determine that the client device 206 and/or the user utilizing the client device 206 is authorized to perform the actions. In these instances, the security element 204 may determine that the client has authorization based on a certain percentage of the responses indicating that the client has authorization for performance of the actions, or responses corresponding to certain authorizers indicate that the client has authorization for performance of the actions.

In some instances, the security element 204 may implement a timer for responses from the authorizers for determination of whether the client has authorization for performance of the actions. For example, if the security element 204 determines that adequate responses from the authorizers for providing the authorization to the client device 206 and/or a user utilizing the client device 206 for performance of the actions have not been received within a time period defined by the timer, the security element 204 may determine that the client device 206 and/or the user utilizing the client device 206 does not have authorization for performance of the actions.

If the security element 204 determines that the client does not have authorization for performance of the actions based on the responses from the authorizers, the security element 204 may not perform the operations associated with the actions. The security element 204 may further remove the stored operations from memory based on the determination that the client does not have authorization for performance of the actions.

If the security element 204 determines that the client has authorization for performance of the actions based on the responses from the authorizers, the security element 204 may perform the operations. For example, the security element 204 may retrieve the signed, serialized operations from memory. The security element 204 may check the signature of the signed, serialized operations to determine whether the operations have been tampered with. For example, the security element 204 may compare a signature of the signed, serialized operations at the time of retrieval with a signature produced when the serialized operations were signed. If the signatures match, the security element 204 may determine that the operations have not been tampered with. If the signatures do not match, the security element 204 may determine that the operations have been tampered with.

If the security element 204 determines that the operations have been tampered with, the security element 204 may prevent the operations from being performed. If the security element 204 determines that the operations have not been tampered with, the security element 204 may proceed with causing the serialized operations to be performed. For example, the security element 204 may cause the serialized operations to be performed by the enclave 202 and/or the infrastructure service, where the serialization of the operations causes state to be taken into account when performing the operations.

Figure 3:
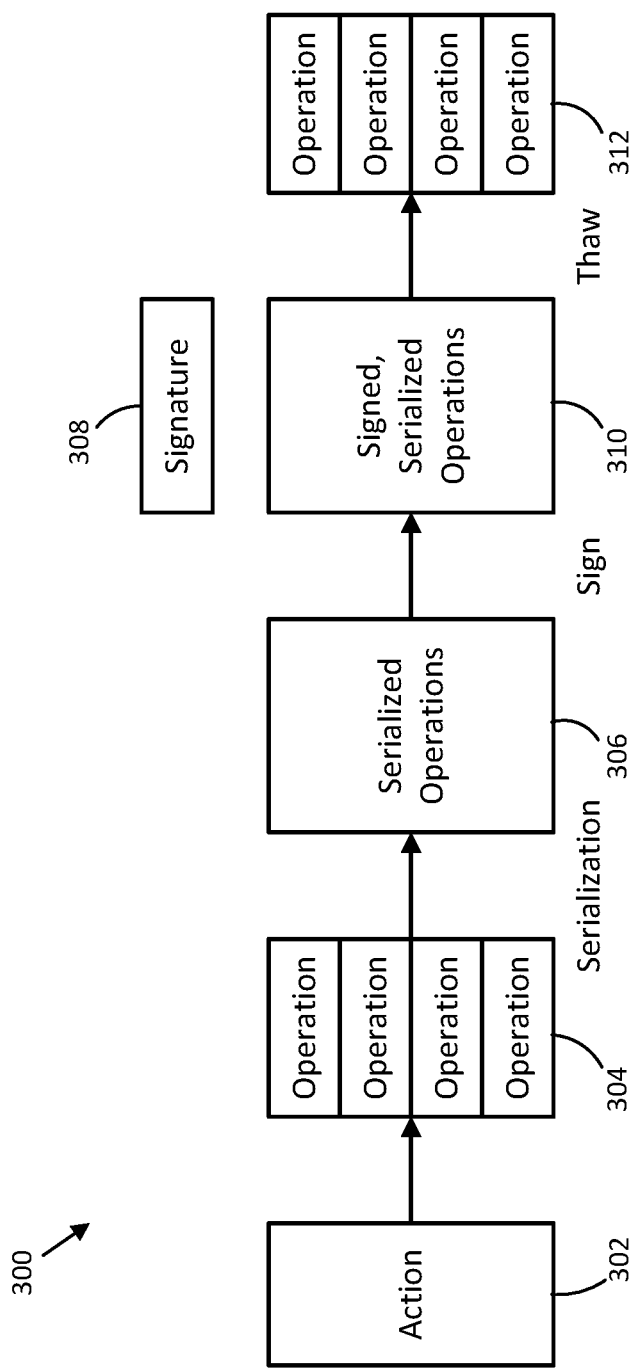
FIG. 3 illustrates an example data transition flow that may be implemented for authorization in accordance with some embodiments.

FIG. 3 illustrates an example data transition flow 300 that may be implemented for authorization in accordance with some embodiments. For example, a security element (such as the security element 108 (FIG. 1) and/or the security element 204 (FIG. 2)) may perform one or more of the transitions with actions received from a client device (such as the client device 206 (FIG. 2)) in some embodiments. The transitions and data structures shown in the data transition flow 300 may facilitate storage of operations from a stateful system in a stateless system for later performance by the stateless system.

The data transition flow 300 may be initiated with an action 302. For example, the action 302 may be received by the security entity from the client device, the action indicates an action for an enclave (such as the enclave 104 (FIG. 1) and/or the enclave 202 (FIG. 2)) and/or an interface corresponding to the security entity to perform for the client device. The security entity may determine that the action 302 is to be stored for performance at a later time.

The data transition flow 300 may include converting the action 302 to one or more operations 304. For example, the security element may convert the action 302 received from the client device to one or more operations 304. The one or more operations 304 may be performed by the enclave and/or the interface to complete the action 302. For example, the action 302 may be in a format that may not be performed by the enclave and/or the infrastructure service and the security element may convert the action 302 into the one or more operations 304 that can be performed by the enclave and/or the infrastructure service to complete the action 302. In other instances, the action 302 provided by the client device may be in a format that can be performed by the enclave and/or the infrastructure service and the action 302 may be utilized as the one or more operations 304. In these instances, the conversion may be omitted.

The data transition flow 300 may include serializing the one or more operations 304. For example, the security element may serialize the one or more operations 304 to produce serialized operations 306. The security element may translate the operations into the serialized operations 306 that can be stored and reconstructed at a later time. The serialization of the operations may maintain the states corresponding to the operations. Accordingly, the enclave and/or the infrastructure service may take the states of the operations into account when performing the operations at a later time. In some instances, serialization may be omitted.

The data transition flow 300 may include signing the serialized operations 306. For example, the security element may sign the serialized operations via an ECDSA. The security element may have a key, and produce a signature 308 with the ECDSA and the key. The security element may sign the serialized operations 306 with the signature 308 to produce signed, serialized operations 310. In some instances, the security element may provide the signature 308 to the client device.

The data transition flow 300 may include thawing the signed, serialized operations. For example, the security element may thaw the signed, serialized operations for performance by the enclave and/or the infrastructure service. Thawing the signed, serialized operations may include verifying the signature 308 of the signed, serialized operations to verify that the operations had not been tampered with between the time that the serialized operations were signed and the time that the signed, serialized operations are being thawed. Thawing the signed, serialized operations may further include deserializing the operations to produce one or more operations 312 that can be performed by the enclave and/or the infrastructure service. For example, the security element may convert the serialized operations into a format that can be performed by the enclave and/or the infrastructure service. The security element may then cause the enclave and/or the infrastructure service to perform the one or more operations 312.

Figure 4:
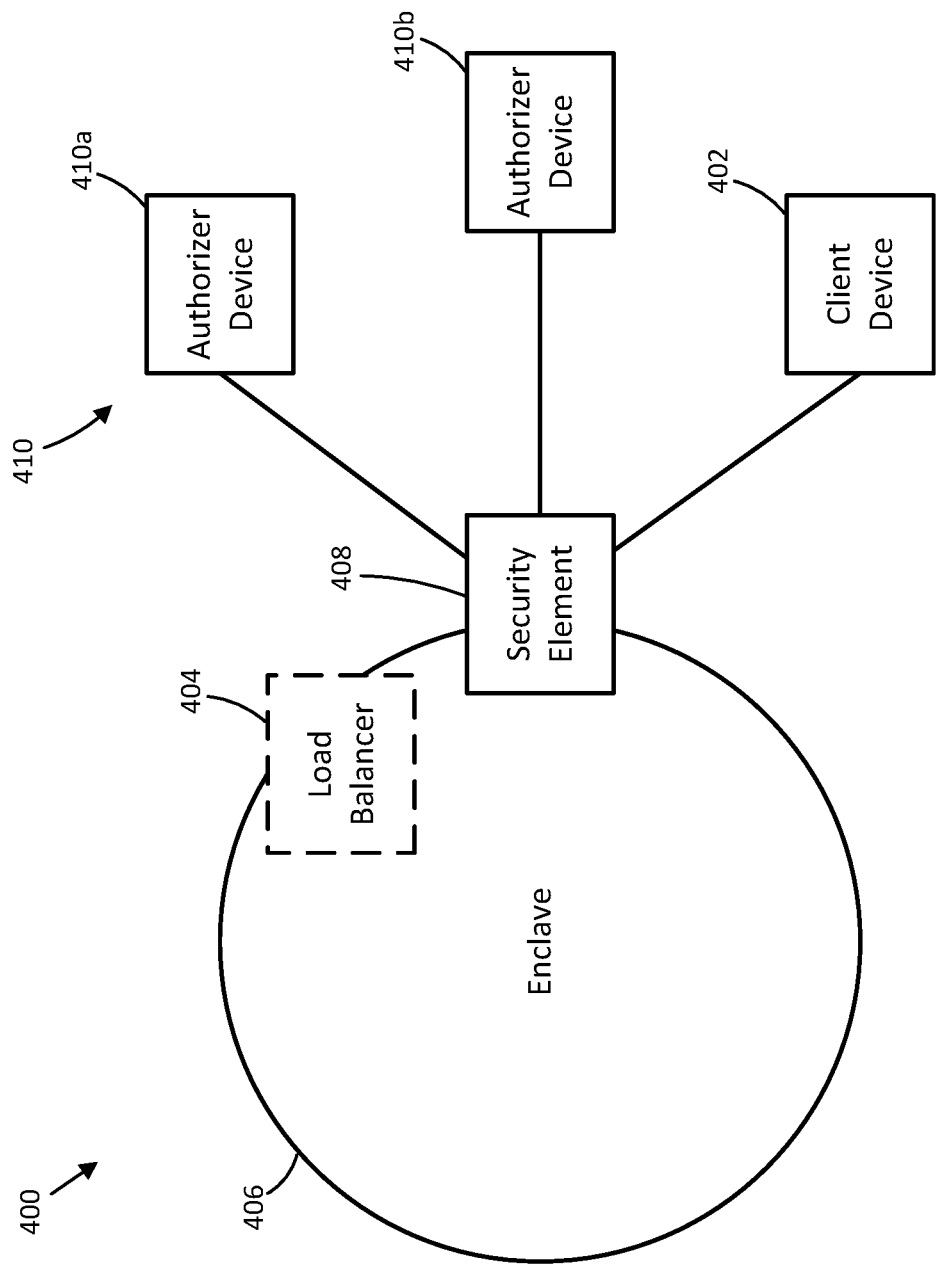
FIG. 4 illustrates another example authorization arrangement in accordance with some embodiments.

FIG. 4 illustrates another example authorization arrangement 400 in accordance with some embodiments. For example, the authorization arrangement 400 illustrates an example where a client device 402 requests a load balancer 404 to be generated. The quorum-based authorization approach may be implemented in the authorization arrangement 400.

The authorization arrangement 400 may include the client device 402. The client device 402 may include one or more of the features of the client device 206 (FIG. 2). In the illustrated embodiment, the client device 402 may be requesting that the load balancer 404 be generated by an enclave 406 and/or an infrastructure service (such as the infrastructure service described in relation to FIG. 1, the cloud infrastructure of FIG. 9, the cloud infrastructure of FIG. 10, the cloud infrastructure of FIG. 11, and/or the cloud infrastructure of FIG. 12). The load balancer 404 may be utilized for directing data transmitted by the client device 402 to the enclave 406 and/or the infrastructure service. For example, the load balancer 404 may be utilized to direct actions requested by the client device 402 or other devices within the enclave 406 and/or the infrastructure service.

The authorization arrangement 400 may include the enclave 406. The enclave 406 may include one or more of the features of the enclave 104 (FIG. 1) and/or the enclave 202 (FIG. 2). The enclave 406 may comprise an infrastructure service, or a portion thereof, such as the infrastructure service described in relation to FIG. 1. The infrastructure service may comprise a computing system, such as a cloud computing system, in some embodiments. The enclave 406 may include a security element 408. The security element 408 may include one or more of the features of the security element 108 (FIG. 1) and/or the security element 204 (FIG. 2). The client device 402 may be coupled with the enclave 406 via a network, such as via the internet, and may communicate with the enclave 406. In the illustrated embodiment, the client device 402, or a user utilizing the client device 402, may transmit a request to the enclave 406 requesting generation of the load balancer 404, or another action that includes generation of the load balancer 404. The security element 408 of the enclave 406 may receive the request and may determine whether the client device 402 and/or the user utilizing the client device 402 has authorization to have the load balancer 404 generated or cause performance of the action that includes generation of the load balancer 404. If the security element 408 determines that the client device 402 and/or the user utilizing the client device 402 had previously been granted authorization to have the load balancer 404 generated or cause performance of the action, the security element 408 may cause the enclave 406 and/or the infrastructure service to generate the load balancer 404.

If the security element 408 determines that the client device 402 and/or the user utilizing the client device 402 had not previously been granted authorization to have the load balancer 404 generated or cause performance of the action, the security element 408 may perform a procedure to determine whether the client device 402 and/or the user utilizing the client device 402 is to receive authorization for the generation of the load balance 404 and/or performance of the action that generates the load balancer 404. For example, the security element 408 may identify one or more authorizers that can provide authorization for the client device 402 and/or the user utilizing the client device 402 to generate the load balancer 404 and/or perform the action that generates the load balancer 404. The authorizers may be predefined or defined at the time of the request. The authorizers may be associated with a same subscriber as the client device 402 and/or the user utilizing the client device 402, or may be assigned by the subscriber.

The security element 408 may store operations for generation of the load balancer 404 and/or the action that generates the load balancer 404 for future performance. The operations may correspond to the generation of the load balancer 404 and/or the action, such that the enclave 406 and/or the infrastructure service performing the operations would result in generation of the load balancer 404 and/or performance of the action. As the client device 402 may be stateful, and the enclave 406 and/or the infrastructure service may be stateless, the enclave 406 and/or the infrastructure service may take the states corresponding to the operations into account during future performance to properly generate the load balancer 404 and/or perform the action. Accordingly, the security element 408 may store the operations in a certain state to maintain the states corresponding to the operations. For example, the security element 408 may serialize the operations for storage to maintain the states corresponding to the operations. The serialization of the operations may provide for the operations to be stored by the security element 408 in a format that can be reconstructed at a later time for performance by the enclave 406 and/or the infrastructure service.

The security element 408 may further sign the operations for storage. The signing of the operations may be utilized for verifying that the operations have not been tampered with prior to performance by the enclave 406 and/or the infrastructure service. The security element 408 may sign the operations via an ECDSA. For example, the security element 408 may utilize ECDSA with a key for signing the operations. A signature produced by the ECDSA and the key may be associated with the operations. The security element 408 may maintain the key within the enclave 406, while the security element 408 may share the signature with the client device 402. The security element 408 may then store the signed, serialized operations, such as in a memory of the security element 408, the enclave 406, and/or the infrastructure service. Using the ECDSA for the signature may provide post quantum security and may utilize less clock cycles as compared to legacy approaches.

The security element 408 may initiate an inquiry procedure for determining whether the client device 402 and/or the user utilizing the client device 402 is to receive authorization for generation of the load balance 404 and/or performance of the action. The security element 408 may identify accounts (such as email accounts, messaging accounts, social media accounts, or other accounts at which an authorizer can be provided a message), telephone numbers, devices, or some combination thereof for the authorizers identified for providing authorization for the client device 402 and/or the user utilizing the client device 402. The security element 408 may transmit one or more requests to each of the authorizers requesting responses indicating whether the client device 402 and/or the user utilizing the client device 402 is to be granted authorization for generation of the load balancer 404 and/or the action. The requests may include an indication of the client device 402 and/or the user of the client device 402 seeking authorization for generation of the load balancer 404 and/or the action. The security element 408 may transmit the requests to one or more of the accounts, telephone numbers, devices, or some combination thereof for each of the authorizers. The requests may request the authorizers to respond with an indication that client device 402 and/or the user utilizing the client device 402 is to be provided with authorization or is not to be provided with authorization for generation of the load balancer 404 and/or the action. In some instances, the security element 408 may send one or more follow up requests after an initial request requesting the indication of whether the client device 402 and/or the user of the client device 402 is to be granted authorization for generation of the load balancer 404 and/or the action.

The authorization arrangement 400 may include one or more authorizer devices 410, such as the first authorizer device 410a and the second authorizer device 410b. The authorizer devices 410 may correspond to one or more of the authorizers. For example, each of the authorizer devices 410 may comprise a device where one or more of the authorizers may access an account, telephone number, and/or the device to which the request is transmitted to by the security element 408. Based on the identified authorizers, the security element 408 may identify the authorizer devices 410 associated with the identified authorizers and transmit the requests to the authorizer devices 410 in some instances. In some instances, the authorizer devices 410 may include input devices that allow the authorizer to input an indication of whether the client device 402 and/or the user utilizing the client device 402 are to be provided authorization for generation of the load balancer 404 and/or performance of the action.

The security element 408 may provide the requests to each of the authorizer devices 410. For example, the security element 408 may transmit the request directly to each of the authorizer devices 410, to accounts that can be accessed via the authorizer devices 410, to telephone numbers associated with the authorizer devices 410, or some combination thereof. In the illustrated embodiment, the security element 408 may transmit one or more requests to the first authorizer device 410a for seeking an indication from a first authorizer and may transmit one or more requests to the second authorizer device 410b for seeking an indication from a second authorizer. In some instances, the first authorizer device 410a and/or the second authorizer device 410b may display a user interface on the device that requests indication of authorization for the client device 402 and/or the user utilizing the client device 402 from the corresponding authorizer. Each of the authorizer devices 410 may detect an indication from the corresponding authorizer of whether the client device 402 and/or the user utilizing the client device 402 are to be provided authorization for generation of the load balancer 404 and/or performance of the action. Based on the indications received from the authorizers, the authorizer devices 410 may transmit indications of whether the client device 402 and/or the user of the client device 402 is to be granted authorization for generation of the load balancer 404 and/or the action. In some instances, one or more of the authorizer devices 410 may not be provided an indication by the authorizer, in which case the one or more of the authorizer devices not receiving an indication may not provide a response to the security element 408.

The security element 408 may monitor for responses from the authorizer devices 410 and may receive the responses from the authorizer devices 410. For example, the security element 408 may receive a first response from the first authorizer device 410a corresponding to the first authorizer and a second response from the second authorizer device 410b corresponding to the second authorizer in the illustrated embodiment. The security element 408 may determine whether the client device 402 and/or the user of the client device 402 is to be granted authorization for generation of the load balancer 404 and/or the action. In some embodiments, the security element 408 may wait until responses are received from all the authorizers to which requests were transmitted prior to determining whether the client device 402 and/or the user of the client device 402 is to be granted authorization for generation of the load balancer 404 and/or the action. If the security element 408 determines that all of the authorizers indicated that the client device 402 and/or the user utilizing the client device 402 are to be authorized for generation of the load balancer 404 and/or performance of the action, the security element 408 may determine that the client device 402 and/or the user utilizing the client device 402 are to be authorized for generation of the load balancer 404 and/or performance of the action. If any of the authorizers indicated that the client device 402 and/or the user utilizing the client device 402 are not to be authorized for generation of the load balancer 404 and/or performance of the action, the security element 408 may determine that the client device 402 and/or the user utilizing the client device 402 are not authorized for generation of the load balancer 404 and/or performance of the action.

In some instances, the security element 408 may not require unanimous indications from the authorizers that the client device 402 and/or the user utilizing the client device 402 is to be granted authorization to determine that the client device 402 and/or the user utilizing the client device 402 is authorized for generation of the load balancer 404 and/or performance of the action. In these instances, the security element 408 may determine that the client has authorization based on a certain percentage of the responses indicating that the client has authorization for generation of the load balancer 404 and/or performance of the action, or responses corresponding to certain authorizers indicate that the client has authorization for generation of the load balancer 404 and/or performance of the action.

In some instances, the security element 408 may implement a timer for responses from the authorizers for determination of whether the client has authorization for generation of the load balancer 404 and/or performance of the action. For example, if the security element 408 determines that adequate responses from the authorizers for providing the authorization for the client device 402 and/or the user utilizing the client device 402 for generation of the load balancer 404 and/or performance of the action have not been received within a time period defined by the timer, the security element 408 may determine that the client device 402 and/or the user utilizing the client device 402 does not have authorization for generation of the load balancer 404 and/or performance of the action.

If the security element 408 determines that the client does not have authorization for generation of the load balancer 404 and/or performance of the action based on the responses from the authorizers, the security element 408 may not perform the operations associated with the generation of the load balancer 404 and/or the action. The security element 408 may further remove the stored operations from memory based on the determination that the client does not have authorization for generation of the load balancer 404 and/or performance of the actions.

If the security element 408 determines that the client has authorization for generation of the load balancer 404 and/or performance of the action based on the responses from the authorizers, the security element 408 may perform the operations. For example, the security element 408 may retrieve the signed, serialized operations from memory. The security element 408 may check the signature of the signed, serialized operations to determine whether the operations have been tampered with. For example, the security element 408 may compare a signature of the signed, serialized operations at the time of retrieval with a signature produced when the serialized operations were signed. If the signatures match, the security element 408 may determine that the operations have not been tampered with. If the signatures do not match, the security element 408 may determine that the operations have been tampered with.

If the security element 408 determines that the operations have been tampered with, the security element 408 may prevent the operations from being performed. If the security element 408 determines that the operations have not been tampered with, the security element 204 may proceed with causing the serialized operations to be performed. For example, the security element 408 may cause the serialized operations to be performed by the enclave 406 and/or the infrastructure service, where the serialization of the operations causes state to be taken into account when performing the operations. The performance of the operations may result in the generation of the load balancer 404. In the illustrated embodiment, the load balancer 404 may be generated in the enclave 406. In other embodiments, the load balancer 404 may be generated in another part of the infrastructure service. In some embodiments, the security element 408 may generate the load balancer 404 at the edge of the enclave 406. The load balancer 404 may be located inside of or outside of a firewall of the enclave 406.

Figure 5:
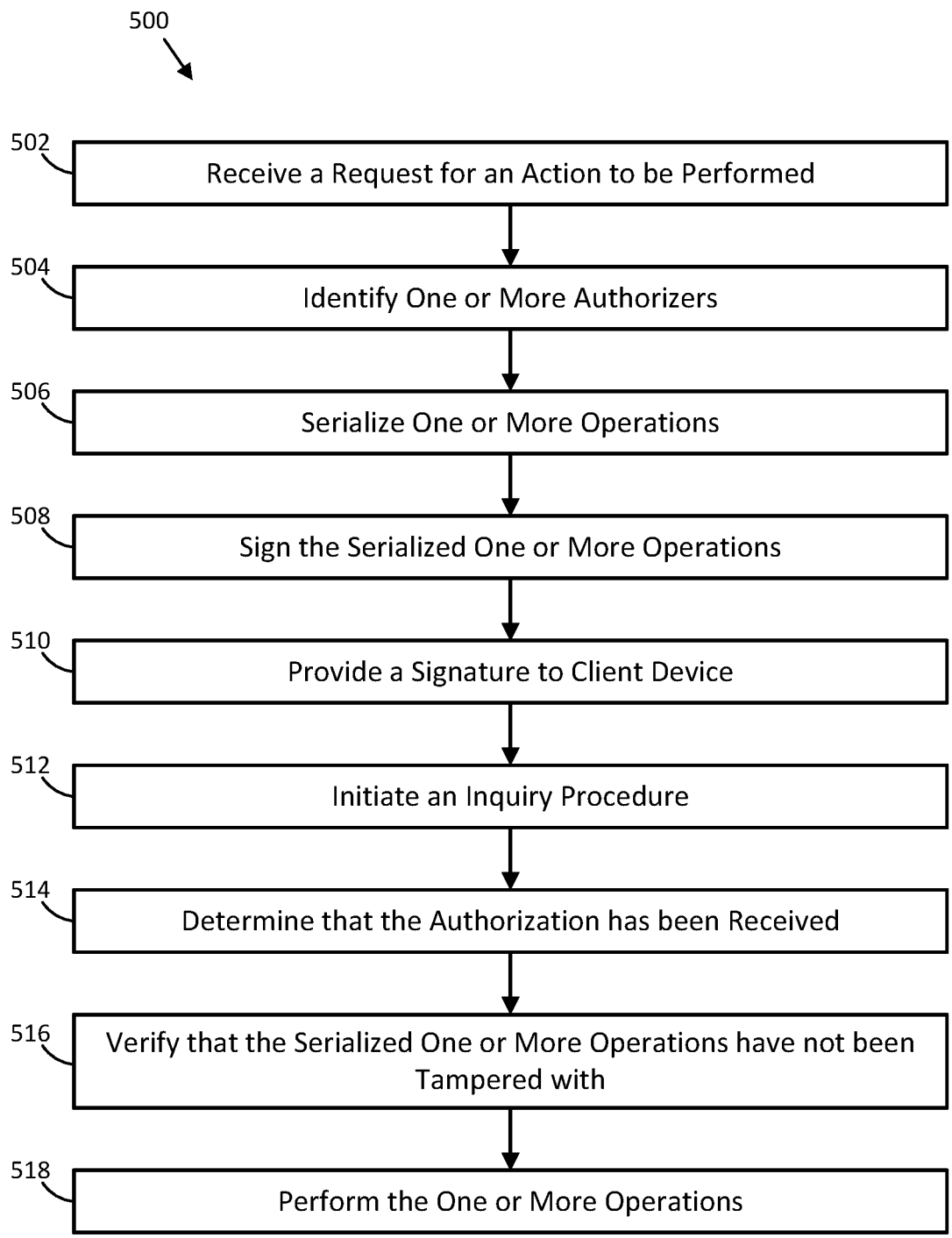
FIG. 5 illustrates an example procedure for authorization of a client for performance of an action in accordance with some embodiments.

FIG. 5 illustrates an example procedure 500 for authorization of a client for performance of an action in accordance with some embodiments. The procedure 500 may be performed by an infrastructure service (such as the infrastructure service described in relation to FIG. 1, the cloud infrastructure of FIG. 9, the cloud infrastructure of FIG. 10, the cloud infrastructure of FIG. 11, and/or the cloud infrastructure of FIG. 12, which may include a computing system, and/or a cloud computing system), an enclave (such as the enclave 104 (FIG. 1), the enclave 202 (FIG. 2), and/or the enclave 406 (FIG. 4)), a security element (such as the security element 108 (FIG. 1), the security element 204 (FIG. 2), and/or the security element 408 (FIG. 4)), or some combination thereof. The procedure 500 may be performed to determine whether a client device (such as the client device 206 (FIG. 2) and/or the client device 402 (FIG. 4)) is authorized for performance of an action (such as generation of a load balancer (such as the load balancer 404 (FIG. 4)).

For brevity, the procedure 500 is described as being performed by a computing system herein, although it should be understood that the procedure 500 may be performed by an infrastructure service, an enclave, the security element, or some combination thereof. In some embodiments, the computing system may comprise a cloud infrastructure service.

In 502, the computing system may receive a request for an action to be performed. For example, the security element may receive a request for an action to be performed by the computing system, the request being received from a client device. In some embodiments, the computing system may comprise a cloud infrastructure service. The cloud infrastructure service may receive the request for the action at an edge of an enclave (such as the edge of the enclave 104 (FIG. 1)) in some embodiments. In some of these embodiments, the cloud infrastructure service may receive the request for the action outside of a firewall of the enclave. In some embodiments, the action may include generating a load balancer (such as the load balancer 404 (FIG. 4)).

In 504, the computing system may identify one or more authorizers. For example, the computing system may identify one or more authorizers from which authorization of the action is to be received. The authorization may correspond to the performance of the action for the client device. The authorizers may include one or more of the features of the authorizers described throughout the disclosure. The authorizers may be identified based on the client device, a user of the client device, the action being requested, or some combination thereof. In some embodiments, the client device and/or the user of the client device may be associated with a subscriber to the computing system, wherein the authorizers may be associated with the same subscriber as the client device and/or the user of the client device. The computing system may identify the one or more authorizers based on a determination that the client device and/or the user of the client device had not previously been granted authorization for performance of the action.

In 506, the computing system may serialize one or more operations. For example, the computing system may serialize one or more operations corresponding to the action requested to be performed. The serialization of the one or more operations may include one or more of the features of serializing operations described throughout this disclosure, such as the serialized operations 306 (FIG. 3). The computing system serializing the one or more operations may maintain the states with the corresponding operations such that the operations can be thawed at a later time for performance of the operations.

In 508, the computing system may sign the one or more serialized operations. For example, the computing system may sign the one or more serialized operations via an ECDSA. The signing of the one or more serialized operations via the ECDSA may include one or more of the features of signing operations via ECDSAs described throughout the disclosure, such as the signed, serialized operations 306 (FIG. 3). For example, the computing system may utilize a key and the ECDSA for generating a signature for signing the one or more serialized operations. The computing system may sign the one or more serialized operations with the signature.

In 510, the computing system may provide the signature to the client device. For example, the computing system may share the signature with the client device while maintaining the key utilized for generating the signature in the computing system, the enclave (such as the enclave 104, the enclave 202, and/or the enclave 406), and/or the infrastructure service. Maintaining the key within the computing system, the enclave, and/or the infrastructure service may provide security against bad actors, while sharing the signature may provide for identification of the client device. In some embodiments, 510 may be omitted.

In 512, the computing system may initiate an inquiry procedure. For example, the computer system may initiate an inquiry procedure for authorization of the action from each of the one or more authorizers to determine whether the one or more operations are authorized to be performed. The inquiry procedure may include one or more of the features of the inquiry procedures for the authorizers described throughout the disclosure. In some embodiments, the inquiry procedure may include transmitting at least one authorization request to each of the one or more authorizers. The computing system may further monitor for responses from each of the one or more authorizers to the at least one authorization request.

In 514, the computing system may determine that the authorization has been received. For example, the computing system may determine that the authorization for the action has been received from each of the one or more authorizers. In particular, the computing system may determine that the client device and/or the user utilizing the client device has authorization for performance of the action. The computing system may determine that authorization has been received in accordance with the approaches for determining that authorization has been received from authorizers described herein, such as all of the authorizers indicating authorization is to be granted, a certain portion of the authorizers indicating authorization is to be granted, or a certain group of the authorizers indicating authorization is to be granted. The action may be to generate a load balancer in some instances, where the authorizers may indicate that the client device and/or the user utilizing the client device is authorized to generate the load balancer. In some embodiments, 514 may be omitted.

In 516, the computing system may verify that the serialized one or more operations have not been tampered with. For example, the computing system may verify, based at least in part on the signature produced by the signing of the serialized one or more operations, that the serialized one or more operations have not been tampered with. The computing system may verify that the one or more operations have not been tampered with based on the signature from the signed, serialized operations at the time of retrieval is the same as the signature at the time that the serialized operations were signed. In some embodiments, 516 may be omitted.

In 518, the computing system may perform the one or more operations. For example, the computing system may perform the one or more operations based at least in part on the determination that the authorization for the action has been received. The computing system performing the one or more operations can cause the action requested by the client device to be performed. In some embodiments, the action may be generation of a load balancer, where the one or more operations cause a load balancer to be generated by the computing system. In embodiments where the computing system is a cloud infrastructure service, the cloud infrastructure service may be configured to create the load balancer at an end of an enclave of the cloud infrastructure service. In some embodiments, 518 may be omitted.

Figure 6:
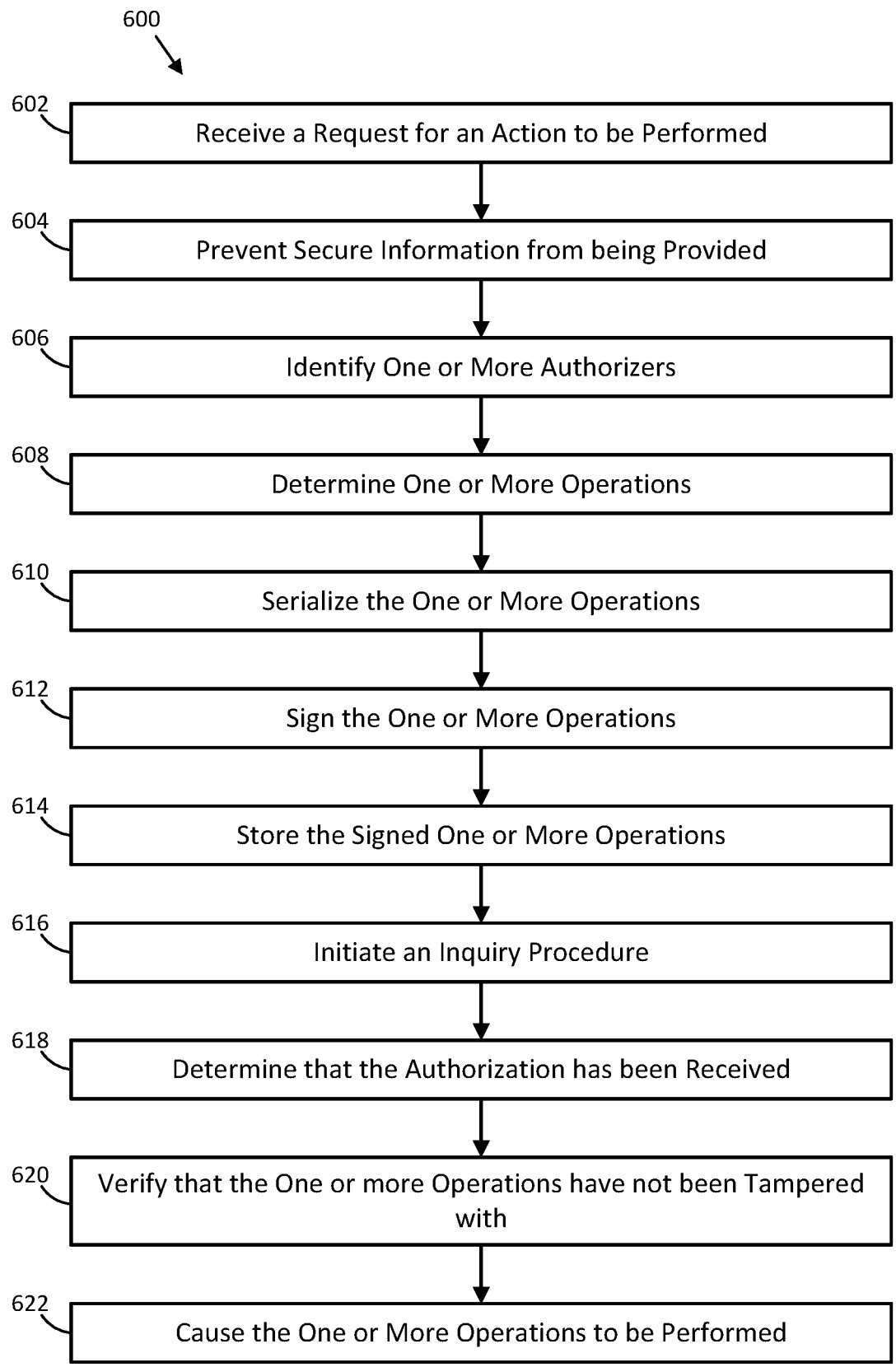
FIG. 6 illustrates another example procedure for authorization of a client for performance of an action in accordance with some embodiments.

FIG. 6 illustrates another example procedure 600 for authorization of a client for performance of an action in accordance with some embodiments. The procedure 600 may be performed by an infrastructure service (such as the infrastructure service described in relation to FIG. 1, the cloud infrastructure of FIG. 9, the cloud infrastructure of FIG. 10, the cloud infrastructure of FIG. 11, and/or the cloud infrastructure of FIG. 12, which may include a computing system, and/or a cloud computing system), an enclave (such as the enclave 104 (FIG. 1), the enclave 202 (FIG. 2), and/or the enclave 406 (FIG. 4)), a security element (such as the security element 108 (FIG. 1), the security element 204 (FIG. 2), and/or the security element 408 (FIG. 4)), or some combination thereof. The procedure 600 may be performed to determine whether a client device (such as the client device 206 (FIG. 2) and/or the client device 402 (FIG. 4)) is authorized for performance of an action (such as generation of a load balancer (such as the load balancer 404 (FIG. 4)).

For brevity, the procedure 600 is described as being performed by a security element herein, although it should be understood that the procedure 600 may be performed by an infrastructure service, an enclave, a computing system, or some combination thereof. In some embodiments, the security element may be part of a cloud infrastructure service.

In 602, the security element may receive a request for an action to be performed. For example, the security element may receive a request for an action to be performed by a cloud infrastructure service. The security element may receive the request from a client device, such as the client device 206 and/or the client device 402 In some embodiments, the security element may be implemented at an edge of an enclave (such as the enclave 104, the enclave 202, and/or the enclave 406) of the cloud infrastructure service. Further, the security element may be implemented outside of a firewall of the enclave in some embodiments. The security element may comprise a proxy or a daemon of the cloud infrastructure service in some embodiments.

In 604, the security element may prevent secure information from being provided. For example, the cloud infrastructure service may be a first cloud infrastructure service and the request may be received from a second cloud infrastructure service in some embodiments, where the client device may be the second cloud infrastructure service or some portion thereof. The security element may prevent secure information related to the first cloud infrastructure service from being provided to the second cloud infrastructure service. The security element may prevent the secure information from being provided to the second cloud infrastructure service prior to receipt of responses received from one or more authorizers in some embodiments. In other embodiments, the security element may prevent the secure information from being provided to the second cloud infrastructure service for the entirety of the procedure 600, and/or for an entirety of the interaction between the first cloud infrastructure service and the second cloud infrastructure service. In some embodiments, 604 may be omitted.

In 606, the security element may identify one or more authorizers. For example, the security element may identify one or more authorizers from which authorization of the action is to be received, the authorization corresponding to the performance of the action. The identified authorizers may be authorizers that can provide authorization for the client device and/or a user utilizing the client device for performance of the action. The authorizers may include the features of one or more of the authorizers described throughout the disclosure, such as the authorizers being associated with a same subscriber of the cloud infrastructure service as the client device and/or the user utilizing the client device.

In 608, the security element may determine one or more operations. For example, the security element may determine one or more operations to be performed by the cloud infrastructure service to complete the action. The cloud infrastructure service may be capable of performing the one or more operations to complete the action requested by the client device. The security element may determine the one or more operations in accordance with the determination of operations for an action described throughout the disclosure.

In 610, the security element may serialize the one or more operations. For example, the security element may serialize the one or more operations corresponding to the action requested to be performed. The serialization of the one or more operations may include one or more of the features of serializing operations described throughout this disclosure, such as the serialized operations 306 (FIG. 3). The computing system serializing the one or more operations may maintain the states with the corresponding operations such that the operations can be thawed at a later time for performance of the operations. In some embodiments, 610 may be omitted.

In 612, the security element may sign the one or more operations. For example, the security element may sign the one or more operations via an ECDSA. The signing of the one or more serialized operations via the ECDSA may include one or more of the features of signing operations via ECDSAs described throughout the disclosure, such as the signed, serialized operations 306 (FIG. 3). For example, the security element may utilize a key and the ECDSA for generating a signature for signing the one or more operations. The security element may sign the one or more operations with the signature. In embodiments where the operations are serialized, the security element may sign the serialized one or more operations.

In 614, the security element may store the signed one or more operations. For example, the security element may store the signed one or more operations in memory of the security element, memory of the enclave, memory of the cloud infrastructure service, or some combination thereof. In embodiments where the operations have been serialized, the security element may store the signed, serialized one or more operations.

In 616, the security element may initiate an inquiry procedure. For example, the security element may initiate an inquiry procedure for authorization of the action based at least in part on responses received from the one or more authorizers. The inquiry procedure may include one or more of the features of inquiry procedures for authorizers described throughout the disclosure. In some embodiments, the inquiry procedure may include transmitting at least one authorization request to the one or more authorizers. The security element may monitor for responses received from the one or more authorizers to the at least one authorization request.

In 618, the security element may determine the authorization has been received. For example, the security element may determine that the authorization of the action has been received from each of the one or more authorizers. In particular, the security element may determine that the client device and/or the user utilizing the client device has authorization for performance of the action. The computing system may determine that authorization has been received in accordance with the approaches for determining that authorization has been received from authorizers described herein, such as all of the authorizers indicating authorization is to be granted, a certain portion of the authorizers indicating authorization is to be granted, or a certain group of the authorizers indicating authorization is to be granted. In some embodiments, 618 may be omitted.

In 620, the security element may verify that the one or more operations have not been tampered with. For example, the security element may verify that the one or more operations have not been tampered with based at least in part on the signature produced by the signing of the one or more operations. The computing system may verify that the one or more operations have not been tampered with based on the signature from the signed operations at the time of retrieval is the same as the signature at the time that the operations were signed. In some embodiments, 620 may be omitted.

In 622, the security element may cause the one or more operations to be performed. For example, the security element may cause the one or more operations to be performed based at least in part on the determining that the authorization of the action has been received. The security element causing the one or more operations to be performed can cause the action requested by the client device to be performed. In some embodiments, 622 may be omitted.

Figure 7:
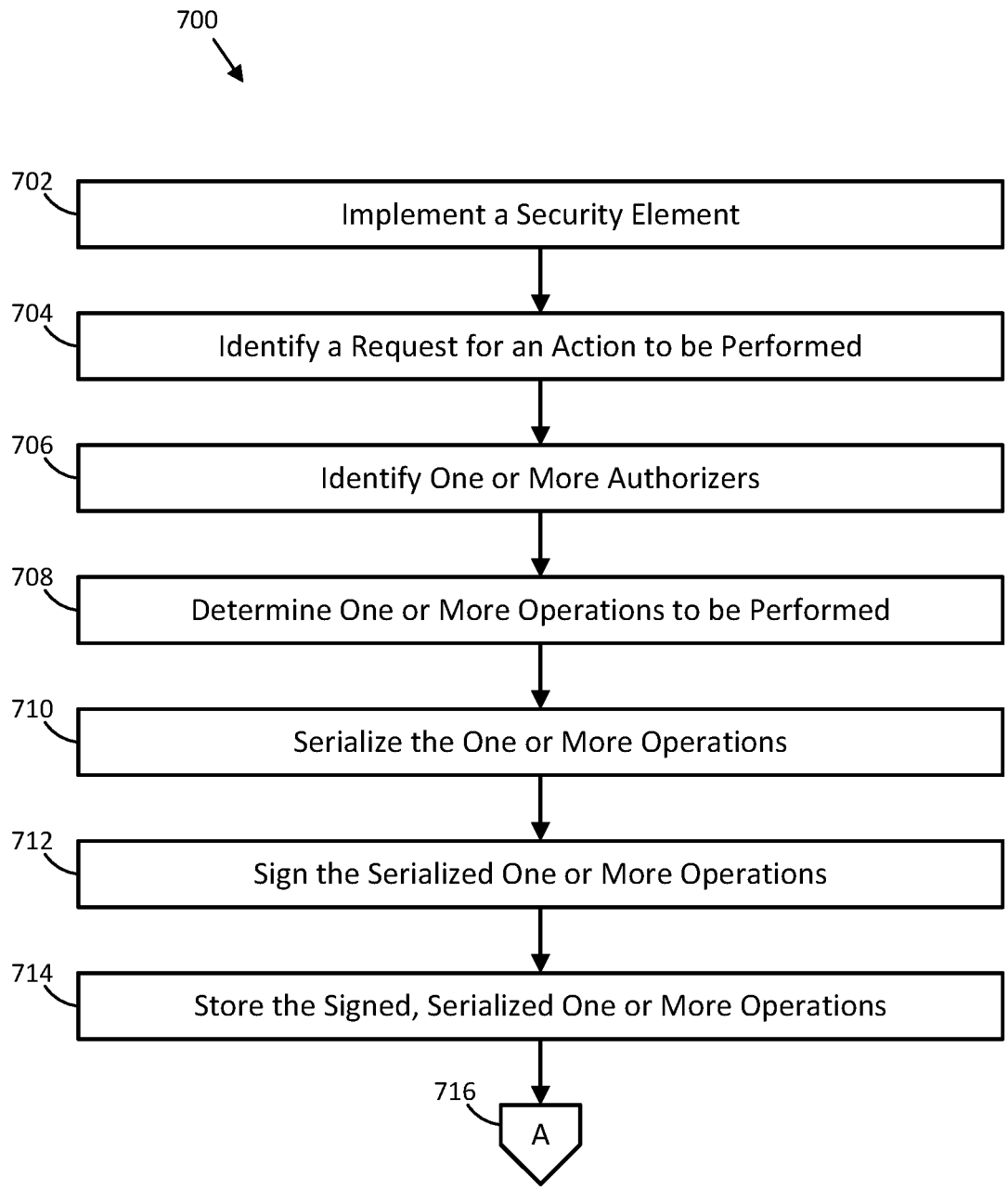
FIG. 7 illustrates a first portion of another example procedure for authorization of a client for performance of an action in accordance with some embodiments.
Figure 8:
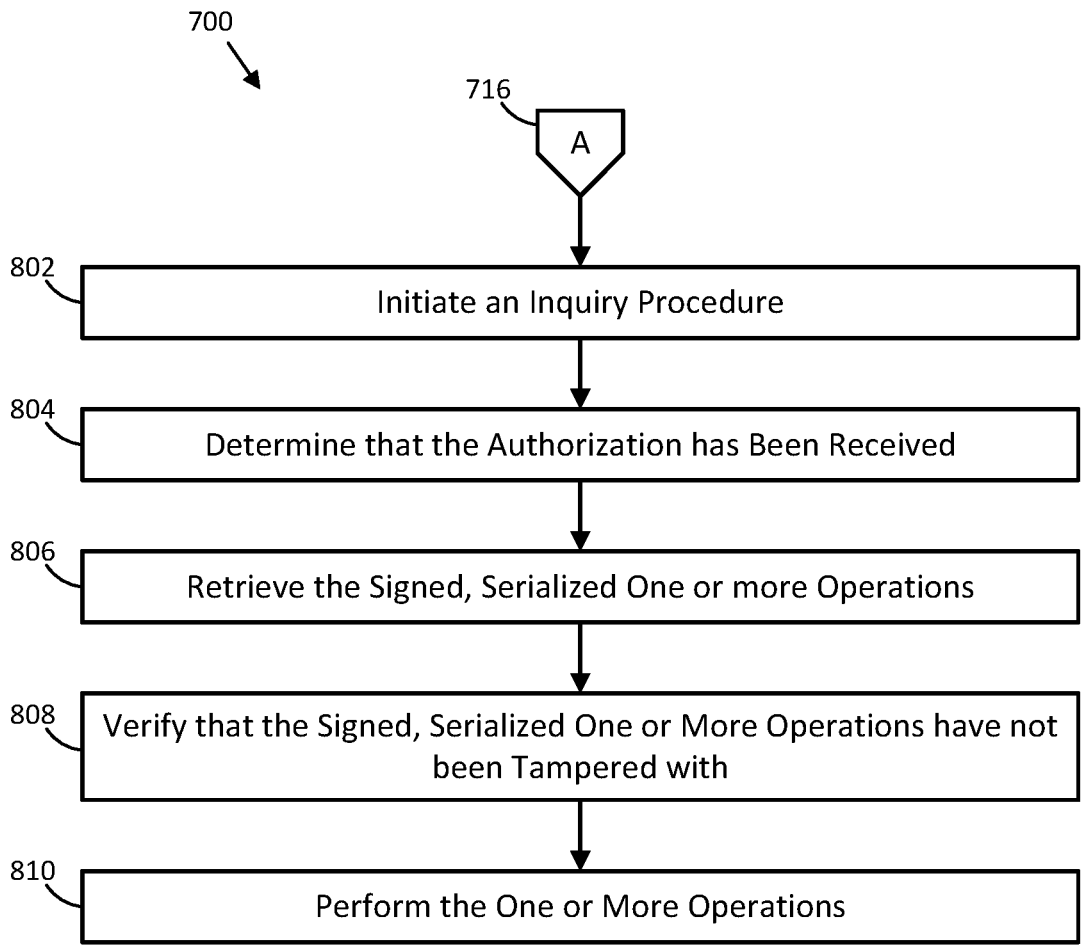
FIG. 8 illustrates a second portion of the example procedure of FIG. 7 in accordance with some embodiments.

FIG. 7 illustrates a first portion of another example procedure 700 for authorization of a client for performance of an action in accordance with some embodiments. FIG. 8 illustrates a second portion of the example procedure 700 in accordance with some embodiments. The procedure 700 may be performed by an infrastructure service (such as the infrastructure service described in relation to FIG. 1, the cloud infrastructure of FIG. 9, the cloud infrastructure of FIG. 10, the cloud infrastructure of FIG. 11, and/or the cloud infrastructure of FIG. 12, which may include a computing system, and/or a cloud computing system), an enclave (such as the enclave 104 (FIG. 1), the enclave 202 (FIG. 2), and/or the enclave 406 (FIG. 4)), a security element (such as the security element 108 (FIG. 1), the security element 204 (FIG. 2), and/or the security element 408 (FIG. 4)), or some combination thereof. The procedure 700 may be performed to determine whether a client device (such as the client device 206 (FIG. 2) and/or the client device 402 (FIG. 4)) is authorized for performance of an action (such as generation of a load balancer (such as the load balancer 404 (FIG. 4)).

For brevity, the procedure 700 is described as being performed by a computing system herein, although it should be understood that the procedure 700 may be performed by an infrastructure service, an enclave, a security element, or some combination thereof. In some embodiments, the security element may be part of a cloud infrastructure service.

In 702, the computing system may implement a security element. For example, the computing system may comprise a cloud infrastructure service, where cloud infrastructure service is to implement a security element at an edge of an enclave of the cloud infrastructure service. The security element may include one or more of the features of the security element 108, the security element 204, and/or the security element 408. In some embodiments, 702 may be omitted.

In 704, the computing system may identify a request for an action to be performed. For example, the computing system may identify a request for an action to be performed by the computing system, the request received from a client device (such as the client device 206 and/or the client device 402). In some embodiments, the computing system may comprise a cloud infrastructure service may receive the request for the action at an edge of an enclave of the cloud infrastructure service in some embodiments. In some of these embodiments, the cloud infrastructure service may receive the request for the action outside of a firewall of the enclave. In embodiments where the computing system implements the security element, the security element may identify the request for the action.

In 706, the computing system may identify one or more authorizers. For example, the computing system may identify one or more authorizers from which authorization of the action is to be received, the authorization corresponding to performance of the action for the client device. The authorizers may include one or more of the features of the authorizers described throughout the disclosure. The authorizers may be identified based on the client device, a user of the client device, the action being requested, or some combination thereof. In some embodiments, the client device and/or the user of the client device may be associated with a subscriber to the computing system, wherein the authorizers may be associated with the same subscriber as the client device and/or the user of the client device. The computing system may identify the one or more authorizers based on a determination that the client device and/or the user of the client device had not previously been granted authorization for performance of the action.

In 708, the computing system may determine one or more operations to be performed. For example, the computing system may determine the one or more operations to be performed by the computing system to complete the action. The computing system may be capable of performing the one or more operations to complete the action requested by the client device. The computing system may determine the one or more operations in accordance with the determination of operations for an action described throughout the disclosure.

In 710, the computing system may serialize one or more operations. The serialization of the one or more operations may include one or more of the features of serializing operations described throughout this disclosure, such as the serialized operations 306 (FIG. 3). The computing system serializing the one or more operations may maintain the states with the corresponding operations such that the operations can be thawed at a later time for performance of the operations.

In 712, the computing system may sign the serialized one or more operations. For example, the computing system may sign the serialized one or more operations via an ECDSA. The signing of the one or more serialized operations via the ECDSA may include one or more of the features of signing operations via ECDSAs described throughout the disclosure, such as the signed, serialized operations 306 (FIG. 3). For example, the computing system may utilize a key and the ECDSA for generating a signature for signing the one or more serialized operations. The computing system may sign the one or more serialized operations with the signature.

In 714, the computing system may store the signed, serialized one or more operations. For example, the computing system may store the signed, serialized one or more operations within memory. The memory may be a memory of the computing system, a memory of a security element, a memory of an infrastructure service, or some combination thereof. The procedure 700 may proceed from 716 of FIGS. 7 to 716 of FIG. 8.

In 802, the computing system may initiate an inquiry procedure. For example, the computing system may initiate an inquiry procedure for authorization of the action from the one or more authorizers. The inquiry procedure may include one or more of the features of the inquiry procedures for the authorizers described throughout the disclosure. In some embodiments, the inquiry procedure may include transmitting at least one authorization request to each of the one or more authorizers. The computing system may further monitor for responses from each of the one or more authorizers to the at least one authorization request.

In 804, the computing system may determine that the authorization has been received. For example, the computing system may determine that the authorization of the action has been received from each of the one or more authorizers. In particular, the computing system may determine that the client device and/or the user utilizing the client device has authorization for performance of the action. The computing system may determine that authorization has been received in accordance with the approaches for determining that authorization has been received from authorizers described herein, such as all of the authorizers indicating authorization is to be granted, a certain portion of the authorizers indicating authorization is to be granted, or a certain group of the authorizers indicating authorization is to be granted. In some embodiments, 804 may be omitted.

In 806, the computing system may retrieve the signed, serialized one or more operations. For example, the computing system may retrieve the signed, serialized one or more operations from the memory. The computing system may retrieve the signed, serialized one or more operations based on the determination that the authorization has been received. In some embodiments, 806 may be omitted.

In 808, the computing system may verify that the signed, serialized one or more operations have not been tampered with. For example, the computing system may verify, based at least in part on the signature produced by the signing of the serialized one or more operations. The computing system may verify that the one or more operations have not been tampered with based the signature from the signed, serialized operations at the time of retrieval is the same as the signature at the time that the serialized operations were signed. In some embodiments, 808 may be omitted.

In 810, the computing system may perform the one or more operations. For example, the computing system may perform the one or more operations based at least in part on the authorization and the signed, serialized one or more operations retrieved from the memory. In some embodiments, the computing system may perform the one or more operations further based at least in part on the verification that the signed, serialized one or more operation have not been tampered with. The computing system performing the one or more operations can cause the action requested by the client device to be performed. In some embodiments, 810 may be omitted.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Memory that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 636 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC 942 of FIG. 9) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway 936 of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171 (1)-(N) may be communicatively coupled to the customer tenancy 1170 and may be configured to transmit or receive data from the customer tenancy 1170. The containers 1171 (1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
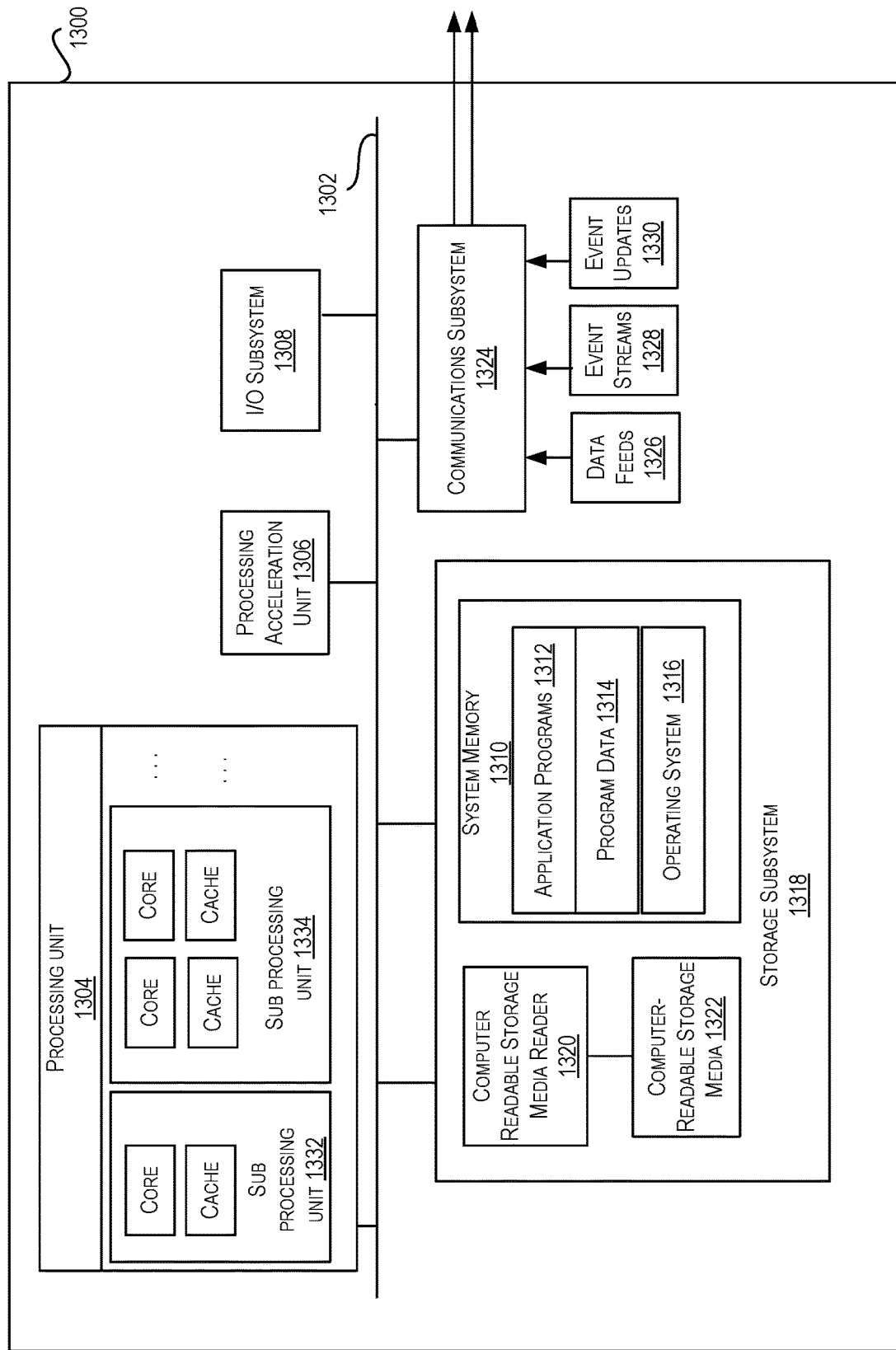
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present disclosure.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. One or more non-transitory, computer-readable media having instructions stored thereon, wherein the instructions, when executed by a cloud infrastructure service, cause the cloud infrastructure service to:
receive a request for an action to be performed by the cloud infrastructure service, the request received from a client device;
identify one or more authorizers from which authorization of the action is to be received, the authorization corresponding to performance of the action for the client device;
serialize one or more operations corresponding to the action, the serialization of the one or more operations configuring one or more states of the one or more operations to be maintained for performance of the one or more operations in accordance with the authorization being received, the one or more states defined by the client device;
sign the serialized one or more operations with a signature via an elliptic curve digital signature algorithm;
provide the signature to the client device;
initiate an inquiry procedure for the authorization of the action from each of the one or more authorizers to determine whether the one or more operations are authorized to be performed;
determine that the authorization of the action has been received from each of the one or more authorizers; and
perform the one or more operations based at least in part on the determination that the authorization of the action has been received.

2. The one or more non-transitory, computer-readable media of claim 1, wherein the instructions, when executed by the cloud infrastructure service, further cause the cloud infrastructure service to:
verify, based at least in part on the signature, that the serialized one or more operations have not been tampered with, wherein the one or more operations are performed based at least in part on the verification that the serialized one or more operations have not been tampered with.

3. The one or more non-transitory, computer-readable media of claim 1, wherein to sign the serialized one or more operations comprises generating the signature.

4. The one or more non-transitory, computer-readable media of claim 1, wherein to initiate the inquiry procedure comprises to:
transmit at least one authorization request to each of the one or more authorizers; and
monitor for responses from each of the one or more authorizers to the at least one authorization request.

5. The one or more non-transitory, computer-readable media of claim 1, wherein the cloud infrastructure service is configured to receive the request for the action at an edge of an enclave of the cloud infrastructure service.

6. The one or more non-transitory, computer-readable media of claim 5, wherein the cloud infrastructure service is configured to receive the request for the action outside of a firewall of the enclave.

7. The one or more non-transitory, computer-readable media of claim 1, wherein the action comprises generating a load balancer, and wherein to perform the one or more operations includes to generate the load balancer.

8. The one or more non-transitory, computer-readable media of claim 7, wherein the cloud infrastructure service is configured to create the load balancer at an edge of an enclave of the cloud infrastructure service.

9. A method of determining authorization of an action for a cloud infrastructure service, comprising:
- receiving, by a security element of the cloud infrastructure service, a request for an action to be performed by the cloud infrastructure service, the request received from a client device;
- identifying, by the security element, one or more authorizers from which authorization of the action is to be received, the authorization corresponding to performance of the action;
- determining, by the security element, one or more operations to be performed by the cloud infrastructure service to complete the action;
- serializing, by the security element, the one or more operations to maintain one or more states of the one or more operations for performance of the one or more operations in accordance with the authorization being received, the one or more states defined by the client device;
- signing, by the security element, the one or more operations with a signature via an elliptic curve digital signature algorithm;
- providing, by the security element, the signature to the client device;
- storing, by the security element, the signed one or more operations;
- initiating, by the security element, an inquiry procedure for the authorization of the action based at least in part on responses received from the one or more authorizers;
- determining, by the security element, that the authorization of the action has been received from each of the one or more authorizers; and
- causing, by the security element, the one or more operations to be performed based at least in part on the determination that the authorization of the action has been received.

10. The method of claim 9, wherein the signing of the one or more operations comprises signing the serialized one or more operations.

11. The method of claim 9, further comprising:
- verifying, by the security element, that the one or more operations have not been tampered with based at least in part on a signature produced by the signing of the one or more operations, wherein the security element causes the one or more operations to be performed based at least in part on the verification that the one or more operations have not been tampered with.

12. The method of claim 9, wherein the security element is implemented at an edge of an enclave of the cloud infrastructure service.

13. The method of claim 12, wherein the security element is implemented outside of a firewall of the enclave.

14. The method of claim 12, wherein the security element comprises a proxy or a daemon of the cloud infrastructure service.

15. The method of claim 9, wherein initiating the inquiry procedure includes:
- transmitting, by the security element, at least one authorization request to the one or more authorizers; and
- monitoring, by the security element, for the responses received from the one or more authorizers to the at least one authorization request, wherein whether the one or more operations are to be performed by the cloud infrastructure service is based at least in part on the responses.

16. The method of claim 9, wherein the cloud infrastructure service is a first cloud infrastructure service, wherein the request is received from a second cloud infrastructure service, and wherein the method further comprises preventing, by the security element, secure information related to the first cloud infrastructure service from being provided to the second cloud infrastructure service prior to receipt of the responses received from the one or more authorizers.

17. A cloud infrastructure service, comprising:
- memory to store operations for performance by the cloud infrastructure service; and
- one or more processors coupled to the memory, the one or more processors to:
  - identify a request for an action to be performed by the cloud infrastructure service, the request received from a client device;
  - identify one or more authorizers from which authorization of the action is to be received, the authorization corresponding to performance of the action for the client device;
  - determine one or more operations to be performed by the cloud infrastructure service to complete the action;
  - serialize the one or more operations to maintain one or more states of the one or more operations for performance of the one or more operations in accordance with the authorization being received, the one or more states defined by the client device;
  - sign the serialized one or more operations with a signature via an elliptic curve digital signature algorithm;
  - provide the signature to the client device;
  - store the signed, serialized one or more operations in the memory;
  - initiate an inquiry procedure for authorization of the action from the one or more authorizers;
  - determine that the authorization of the action has been received from each of the one or more authorizers; and
  - perform the one or more operations based at least in part on the determination that the authorization of the action has been received.

18. The cloud infrastructure service of claim 17, wherein the one or more processors are further to:
- retrieve the signed, serialized one or more operations from the memory; and
- perform the one or more operations based at least in part on the signed, serialized one or more operations retrieved from the memory.

19. The cloud infrastructure service of claim 18, wherein the one or more processors are further to verify, based at least in part on a signature produced by the signing of the serialized one or more operations, that the signed, serialized one or more operations have not been tampered with, and wherein the one or more operations are to be performed based at least in part on the verification that the signed, serialized one or more operations have not been tampered with.

20. The cloud infrastructure service of claim 17, wherein the one or more processors are further to implement a security element at an edge of an enclave of the cloud infrastructure service, and wherein the security element is to identify the request for the action.

* * * * *